United States Patent [19]

Ibi

[11] Patent Number: 5,619,679

[45] Date of Patent: Apr. 8, 1997

[54] MEMORY CONTROL DEVICE AND METHOD OPERATED IN CONSECUTIVE ACCESS MODE

[75] Inventor: Takashi Ibi, Kawasaki, Japan

[73] Assignee: Fujitsu Limited, Kawasaki, Japan

[21] Appl. No.: 396,110

[22] Filed: Feb. 28, 1995

[30] Foreign Application Priority Data

Mar. 14, 1994 [JP] Japan .................................. 6-042105

[51] Int. Cl.$^6$ .................................................. G06F 12/00
[52] U.S. Cl. ........................ 395/494; 395/484; 395/854; 395/873; 395/881; 395/551; 364/DIG. 1
[58] Field of Search .................................. 395/484, 494, 395/550, 854, 873, 881

[56] References Cited

U.S. PATENT DOCUMENTS

| | | | |
|---|---|---|---|
| 4,422,160 | 12/1983 | Watanabe | 365/189 |
| 4,429,375 | 1/1984 | Kobayashi et al. | 365/240 |
| 4,485,461 | 11/1984 | Kobayashi | 365/239 |
| 5,051,889 | 9/1991 | Fung et al. | 395/484 |
| 5,163,132 | 11/1992 | DuLac et al. | 392/873 |

*Primary Examiner*—Frank J. Asta
*Attorney, Agent, or Firm*—Staas & Halsey

[57] ABSTRACT

A memory control device and method receives a request to transfer a series of first-unit K byte (for example, 512) data in an address space, divides the first-unit K into second-unit L (for example, 64), assigns priority levels to the second-unit L, issues plural times a data transfer instruction to transfer the L-byte data to a memory device comprising a plurality of memories operable in a consecutive access mode, and thus accesses memories in response to the request to transfer the K-byte data. The L-byte data are sequentially allocated in third units S (for example, 64) specified by the data transfer instruction to the memories. The third unit is equal to L or is obtained by dividing L, and is a multiple of an activation unit of the memories. The S-byte data are accessed in the allocated memories in the consecutive access mode.

16 Claims, 20 Drawing Sheets

FIG. 17A GCLK
FIG. 17B +GSIG
FIG. 17C −GSIG
FIG. 17D FCLK
FIG. 17E −FSIG
FIG. 17F +FSIG
FIG. 17G +UP
FIG. 17H +DN
FIG. 17I +TRIG

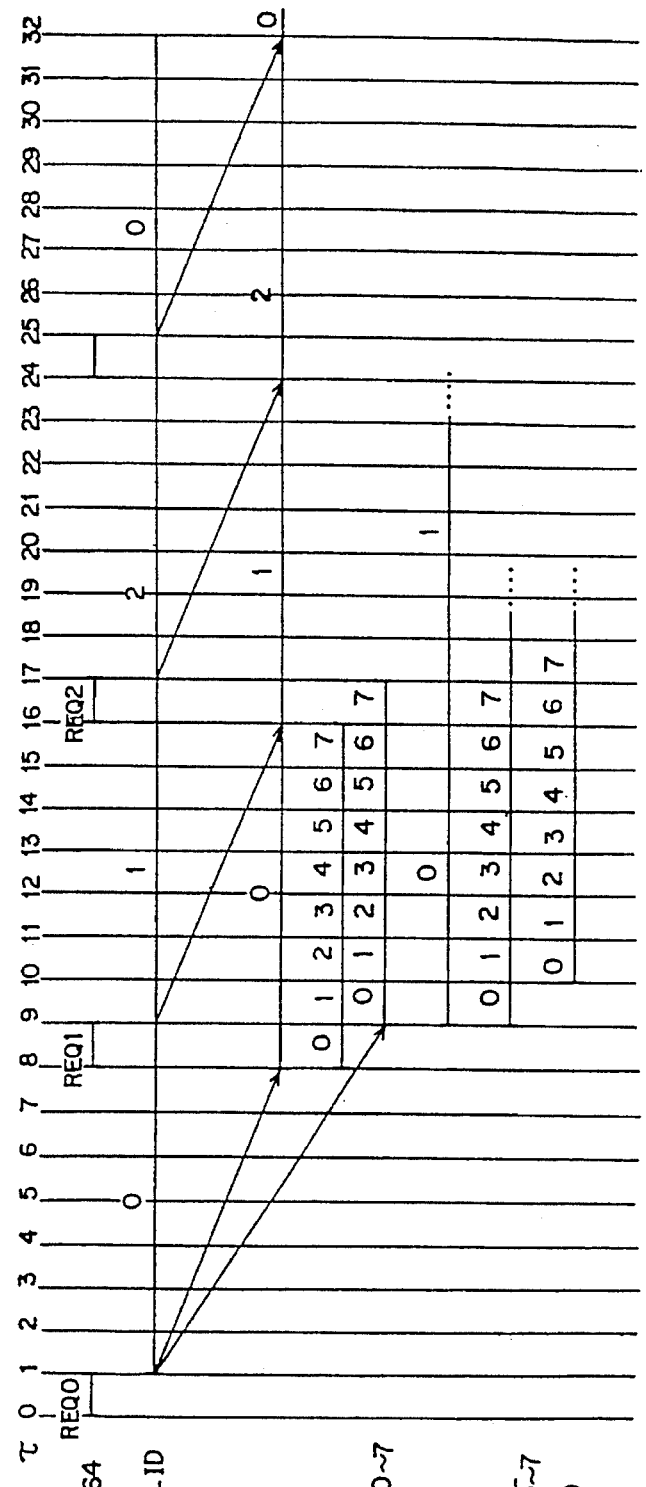

MEMORY CONTROL DEVICE AND METHOD OPERATED IN CONSECUTIVE ACCESS MODE

BACKGROUND OF THE INVENTION

1. Field of the Invention

The present invention relates to a memory control technology for controlling memories in storage devices of computer systems such as DRAMs through which data are written and read in a consecutive access mode, clock-synchronous DRAMs, etc.

2. Description of the Related Art

For example, a DRAM (dynamic RAM) can be operated in a consecutive access mode. In the consecutive access mode, the DRAM receives as activation signals a RAS signal (row address signal), a WE signal (write enable signal), address signals, etc. when data are written. Then, the value of the address signals is incremented by one synchronously with a CAS signal (column address signal), and the synchronously entered data are written to a cell specified by the address signals in the DRAM. Likewise, the DRAM increments by one the value of the address signals synchronously with the CAS signal when data are read. The data are read from a cell specified by the address signals in the DRAM, and are output synchronously with the CAS signal. On the other hand, the clock-synchronous DRAM controls data access by receiving a clock while the above described DRAM controls data access synchronously with the CAS signal. However, these DRAMs have the same fundamental capabilities.

As described above, the present invention relates to a technology of controlling a memory in the consecutive access mode.

Described below are the first technological field practically related to the present invention, and the related arts associated with the present invention.

Assume that a storage system comprises three storage layers, that is, a buffer storage device (cache memory) having a small storage capacity and operating at a high speed in a central processing unit (CPU); an intermediate buffer storage device (secondary cache memory) having an medium-size storage capacity and operating at a moderate speed in a storage control device; and a main storage device having a large storage capacity and operating at a relatively low speed.

Among these storage devices, a block is referred to as a data unit for use in managing and controlling data when they are transferred. The size of a block depends on the combination of storage units from/to which data are transferred. That is, when data are transferred between the buffer storage device and the intermediate buffer storage device, the block size is 64 bytes. When data are transferred between the intermediate buffer storage device and the main storage device, the block size is 512 bytes. The difference in block size comes from the difference in the utilization of each storage device, and the restriction of the memory capacity required for each storage device to control blocks.

Data are transferred between the storage devices in the above described storage system. That is, if desired data are not found in the buffer storage device while the data are transferred between a CPU and the buffer storage device, then a 64-byte block containing the data are read from the intermediate buffer storage device to the buffer storage device. This process is referred to as a move-in. If there is no area for the move-in process because all storage areas are occupied in the buffer storage device, then a block indicating the lowest utilization or the oldest moved-in is written to the intermediate buffer storage device, and an object block is moved in from the intermediate buffer storage device to the storage area previously occupied by the written block. The above described writing operation is referred to as a move-out. Furthermore, if no object data are found in the intermediate buffer storage device in the move-in operation from the intermediate buffer storage device to the buffer storage device, then a 512-byte block containing the data are moved in from the main storage device to the intermediate buffer storage device. If there is no area for the move-in process because all storage areas are occupied in the intermediate buffer storage device, then a block indicating the lowest utilization or the oldest moved-in is moved out to the main storage device, and an object block is moved in from the main storage device to the storage area previously occupied by the written block.

As described above, the present invention relates to a technology of efficiently accessing the main storage device using the DRAM in the consecutive access mode in a storage system in which data are transferred in different block sizes between the buffer storage device and the intermediate buffer storage device, and between the intermediate buffer storage device and the main storage device.

Described below is the first prior art associated with the present invention in the above described first technological field, FIG. 1 shows the first prior art.

FIG. 1 illustrates the configuration of the main storage device, and the main storage device can be accessed in 8-byte units (word unit). Then, the main storage device comprises two pairs of independently accessed RAMs 101, each comprising bank 0 and bank 1. A pair of the RAMs 101 comprises four DRAM chip sets CS 0–CS 3. One DRAM chip set has 1-megaword storage capacity as shown in FIG. 1. Accordingly, the main storage device shown in FIG. 1 has the following storage capacity.

8 bytes×1 megaword×4 chip sets×2 banks=64 megabytes

Assuming that the block size of the data transferred between the above described main storage device and the intermediate buffer storage device (not shown in FIG. 1) is K (for example, 512), all K-byte data in one block are assigned to a set of the RAMs 101 conventionally.

If the intermediate buffer storage device requests a move-out to the main storage device, a storage control device not shown in FIG. 1 realizes a move-out of a block comprising K-byte data by issuing to a set of the RAMs 101 forming the main storage device a write instruction of an L (for example, 64)-byte-data block (K is a multiple of L) for K/L (for example, 8) times while performing a priority process.

If a single CPU uses the main storage device, then the storage control device can issue continuously K/L (for example, 8) times an instruction to write an L-byte data block. Therefore, a set of the RAMs 101 comprising the DRAM which receives the issues process the write instruction in the consecutive access mode.

If a write instruction to write an L-byte-data (L=64) block is issued to a set of the RAMs 101 for practical example, then the RAMs 101 increment the address value by 1 synchronously with a write pulse (a CAS signal or a clock signal), and synchronously write 8-byte data input 8 times continuously via data bus of an 8-byte data width to a cell in the RAMs 101 specified by the address signals. The RAMs 101 can also perform a write process continuously in response to a write instruction to write an L=64 byte data block to be issued after the above described instruction to write an L=64 byte data block. Thus, performing the write instruction to write an L=64 byte data block 8 times realizes a move-out of the block comprising 8 bytes×8 times×8 times=512 Kbytes.

The above explanation indicates the control made when a move-out to the main storage device is requested by the intermediate buffer storage device. However, the similar control is made when the intermediate buffer storage device requests a move-in from the main storage device.

As described above, all data in a K-byte block are assigned to a set of the RAMs 101 according to the first prior art so that the effect of the consecutive access mode of the RAMs 101 comprising a DRAM can work the most efficiently. In the RAMs 101, a write instruction or a read instruction respectively to write or read an L-byte-data block is executed K/L times continuously in the consecutive access mode.

If a K-byte-data block is transferred between the intermediate buffer storage device and the main storage device, then the storage control device does not issue to the main storage device one write instruction or a read instruction respectively to write or read a K-byte-data block, but issues K/L times the write instruction or the read instruction respectively to write or read an L-byte-data block on the following ground.

If, for example, the buffer storage device in the CPU issues a request to move in an L (for example, 64)-byte-data block in the intermediate buffer storage device, then the storage control device must move in from the main storage device to the intermediate buffer storage device a K (for example, 512)-byte-data block comprising the L-byte data blocks when an object block are not stored in the intermediate buffer storage device. At this time, among the data forming the K-byte data block to be moved in from the main storage device to the intermediate buffer storage device, data of a specific L-byte block must be immediately moved in to the buffer storage device in the CPU from the intermediate buffer storage device. So, the storage control device does not issue one read instruction to read an K-byte-data block, but issues K/L times a read instruction to read L-byte-data block. Thus, moving in by priority from the main storage device to the intermediate buffer storage device at the first read instruction the L-byte data required to be immediately moved in to the buffer storage device in the CPU from the intermediate buffer storage device greatly improves the response of the storage system.

If all storage areas are occupied in the intermediate buffer storage device and there is no area to move data in, and even if a specific K-byte-data block in the intermediate buffer storage device is to be moved out to the main storage device, the storage area in the intermediate buffer storage device should be released by the highest priority for the L-byte-data block to be immediately moved in from the intermediate buffer storage device to the buffer storage device in the CPU. Although the K-byte-data block is moved out from the intermediate buffer storage device to the main storage device, the storage control device significantly issues a write instruction to write data in L-byte data block units to the main storage device.

However, the above described first prior art has the following problems.

According to the first prior art shown in FIG. 1, the consecutive access mode works the most efficiently in the RAMs 101 comprising DRAMs by assigning all data in a K-byte-data block to a set of the RAMs 101 if a single CPU occupies the main storage device.

If the main storage device is shared among a plurality of CPUs, the buffer storage device in each CPU may issue to the intermediate buffer storage device a request for L (for example, 64)-byte-data blocks belonging to a K (for example, 512)-byte-data block separately stored in the main storage device. At this time, data to be immediately moved in by the buffer storage device in each CPU from the intermediate buffer storage device among data forming K-byte-data blocks to be moved in from the main storage device to the intermediate buffer storage device comprise specific L-byte-data blocks. Therefore, it is desirable that the storage control device processes by priority the specific blocks comprising L-byte data requested by each CPU.

As described above, when a K-byte-data block is transferred between the intermediate buffer storage device and the main storage device, the storage control device issues K/L times to the main storage device a write instruction or a read instruction to write or read the L-byte-data block. If a new K-byte-data block must be moved in from the main storage device to the intermediate buffer storage device in association with a request for a specific L-byte-data block from another CPU during the issue of a write instruction or a read instruction to write or read an L-byte-data block to the main storage device K/L times, then the storage control device suspends the K/L-time issue of the write or read instruction and executes the leading read instruction by priority among the K/L read instructions issued to move in the new block. The leading read instruction is to read the L-byte-data block requested by the other CPU.

As described above, even if the K-byte-data block is moved out from the intermediate buffer storage device to the main storage device, the storage control device executes the leading write instruction by priority among K/L write instructions so that a storage area in the intermediate buffer storage device can be obtained by highest priority for the specified L-byte-data block.

However, since all data in the K-byte-data block are assigned to a set of the RAMs 101 (shown in FIG. 1) according to the first prior art, it is necessary in a set of the RAMs 101 to control, that is, activate or stop, access to L-byte-data blocks at separate addresses when two or more blocks, each comprising K-byte data and being simultaneously accessed, are contained in the set of the RAMs 101. When accessed blocks have separate addresses in the RAMs 101 comprising DRAMs, an accessing operation can be activated only after a predetermined pause if the accessing operation is once interrupted. The pause occupies 30~40% of the cycle time of the DRAM. According to the first prior art, if there are a plurality of CPUs simultaneously using the main storage device comprising a DRAM, then the cycle time is prolonged when the DRAM is accessed, thereby lowering the throughput of the system.

Described below are the second technological field according to the present invention and the two related prior arts.

Well-known prior arts related to the second technological field are Tokukosho 63-155340, Tokukaihei 1-152547, and Tokukaihei 4-153845, each relating to a memory control technology in a single clock mode used when an entire computer system is tested.

A DRAM requires a periodical refreshing operation to maintain stored data, and uses a timing signal generated by a clock signal which is always in an active state.

While a computer system is being tested, the operation state of the entire system is recognized in a single clock mode by providing each system operation clock for the entire system in a manual operation and observing at each clock an output value of each flipflop, latch, etc. in the system.

To realize an operation in the single clock mode, two types of clock sources are normally provided in the computer system. One is a free run clock (FCLK) which is normally generated in a normal operation state of a computer and is incessantly generated. The other is a gated clock (GCLK), and is generated by having an FCLK pass through a gate controlled according to a clock enable signal. The clock enable signal becomes active predetermined times at a predetermined timing to output the FCLK predetermined times at a predetermined timing. The signal is always active in a normal clock mode other than a single clock mode. Therefore, the phases of the FCLK and GCLK match in the normal clock mode.

To observe the output of a latch, etc. during the test, input clocks should be inactive. Accordingly, if the operation state of the system is recognized, it is desirable that the system comprises latches, etc. operated based on the GCLK. However, if the timing signal and a data signal provided for the DRAM are generated through latches, then a timing cannot be generated for use in a refreshing operation of the DRAM, thereby losing stored data. Therefore, timing signals and data signals provided for the DRAM should be generated through a latch operating according to the FCLK.

As described above, the present invention relates to a technology of providing data from a latch operated according to the GCLK for the DRAM operated according to the FCLK in the consecutive access mode so that the system can be operated as if it were in a normal clock mode even if it actually is in a single clock mode.

Described below is the second prior art practically associated with the present invention in the above mentioned second technological field. The second prior art relates to a technology of controlling a write of data to the main storage device in a DRAM.

FIG. 2 shows the configuration of the second prior art. FIGS. 3A–3D are timing charts showing an operation in the single clock mode of the second prior art. Write data used when a write access is made to a main storage device 202 are transferred from a storage control device 201 to a main storage device 202 through a write data bus 203 provided between the storage control device 201 and the main storage device 202. Each time the GCLK is entered, write data of the amount depending on the bus width of a write data bus are transferred to the main storage device 202.

In the main storage device 202, the write data transferred synchronously with the GCLK are stored in a data register (WD_REG) 204 operated according to the GCLK. The output of the register is written to RAMs 205 synchronously with a write timing signal (for example, RAS signals, CAS signals, etc.) operated according to the FCLK.

Assuming that the size of a block of write data simultaneously transferred to the main storage device 202 is L=64 bytes and that the width of the write data bus 203 is 8 bytes, 1-block write data are transferred via the write data bus 203 synchronously with the GCLK after being divided into 8 sections synchronously with the GCLK. Therefore, there are eight sets of WD_REGs 204 #0–#7 and eight sets of RAMs 205 (banks 0–7) provided in the main storage device 202 as shown in FIG. 2.

With the above described configuration, if the write data comprising the first 8 bytes in an L (=64)-byte-block are transferred from the storage control device 201 to the main storage device 202 together with a write instruction STR-8 and an address ADD synchronously with the GCLK, then write data are stored in a flipflop (F/F) 206 and the write instruction STR-8 and the address ADD are stored in an F/F 207 at a timing (referred to as stage 0) synchronous with the GCLK initially generated after the transfer is started in the main storage device 202. At stage 0, a first decoder #1DEC 208 decodes a 3-bit bank address part BANK ADD in the address ADD stored in the F/F 207. As a result, a write data set signal WD_SETi (i can be 0–7) for the bank address part BANK ADD becomes active. Accordingly, the write data stored in the F/F 206 at stage 0 are stored in the #1 WD_REG 204 for the write data set signal WD_SETi at a timing (referred to as stage 1) preceded by stage 0 synchronously with the GCLK. The write data are output to the RAMs 205 in the bank i for the #i WD_REG 204.

At stage 1, the address ADD stored in the F/F 207 at stage 0 is stored in an F/F 209, and the 3-bit bank address part BANK ADD in the address ADD is decoded by a second decoder (#2DEC) 210. As a result, a selection signal SELi (i can be 0–7) for the bank address part BANK ADD becomes active at stage 1 as shown in FIG. 3A.

Furthermore, the selection signal SELi is input to a #i differentiation circuit 211. In the #i differentiation circuit 211, a signal SELiDL shown in FIG. 3B is generated delaying the selection signal SELi by one clock of the FCLK. A write start signal FCLGOi shown in FIG. 3C is generated using the signal SELiDL and the selection signal SELi. The write start signal FCLGOi is stored in a #i F/F 212 synchronously with the FCLK, which is synchronous with the GCLK, immediately after stage 1. An output of the #i F/F 212 is provided for the RAMs 205 in bank i as a #i negative logic RAS signal shown in FIG. 3D. The #i negative logic RAS signal is represented as "RASi" with a horizontal line above in FIGS. 2 and 3A–3D. The character i indicates any number of 0–7. The #i negative logic RAS signal is input to a bank i timing generator through a #i F/F 213 operating synchronously with the FCLK. The bank i timing generator generates synchronously with the FCLK a timing signal required by the RAMs 205 in bank i in a single writing operation. As a result, the bank i write data stored in the #i WD REG 204 synchronously with the GCLK at stage 1 are written to the RAMs 205 in bank i synchronously with the FCLK to be generated later.

After the first write data are input to the main storage device 202 synchronously with a GCLK as described above, the second write data are input to the main storage device 202 synchronously with the next GCLK. The write data are written to the RAMs 205 in the bank at the bank address part BANK ADD in the address ADD input together to the main storage device 202. Thus, when write data synchronous with the GCLK are transferred 8 times from the storage control device 201, the RAMs 205 in each bank is sequentially activated and write data are written to each of the RAMs 205.

FIG. 2 shows the configuration for simple explanation in which a write instruction STR-8 and an address ADD are transferred from the storage control device 201 to the main storage device 202 corresponding to each piece of write data. Normally, the write instruction STR-8 and the address ADD are transferred from the storage control device 201 to the main storage device 202 and stored there only when the first 8-byte write data in an L (=64)-byte block are transferred. Each time the second piece and subsequent write data are transferred from the storage control device 201 to the main storage device 202, the value of the bank address part BANK ADD in the address ADD is incremented by 1 in the main storage device 202, and a write address is generated for each piece of the write data.

If the main storage device 202 of the above described configuration is operated in a normal clock mode, then the phases of the FCLK and GCLK match. If, by contrast, the main storage device 202 is operated in a single clock mode, then the input intervals T'0 (not always at regular intervals) of the GCLK are much longer than the cycle T of the FCLK as shown in FIGS. 3A–3D. Thus, in such a single clock mode, the input timing of the write data to the main storage device 202 and the specification timing of a write address to the RAMs 205 are synchronous with the GCLK in the main storage device 202 according to the second prior art shown in FIG. 2 because the #1DEC 208 for outputting the write data set signal WD_SETi for use in controlling the WD_REG 204 and the #2DEC 210 for outputting the selection signal SELi for use in generating a write address operate synchronously with the GCLK. Thus, similar operations are realized in a normal clock mode and a single clock mode in the main storage device 202 according to the second prior art.

However, the above described second prior art has the following problems.

According to the second prior art shown in FIG. 2, the WD_REG 204 which is specified by the bank address part BANK ADD and can be operated independently and the corresponding RAMs 205 are provided for each piece of write data transferred synchronously with the GCLK of 1 clock. They are sequentially activated synchronously with the GCLK. Thus, according to the second prior art, writing an L (=64)-byte block requires the 8-bank RAMs 205. If a write process in a single bank requires time longer than 8 cycles of the FCLK, then the L (=64)-byte block transferred from the storage control device 201 to the main storage device 202 within the time of 8 cycles of the GCLK having the same phase as the FCLK in the normal clock mode cannot be written consecutively. In this case, each of the RAMs 205 requires more banks. Thus, the second prior art has the problem of a large-scale hardware.

Described below is the third prior art related to the present invention in the second technological field. The third prior art relates to the technology of controlling data read from the main storage device comprising DRAMs.

FIG. 4 shows the configuration of the main storage device in the third prior art. FIGS. 5A–5C are timing charts showing the operation according to the third prior art.

If the main storage device shown in FIG. 4 is operated in the normal clock mode, then a read instruction FCH 64 input from the storage control device (not shown in FIG. 4) to the main storage device is stored in an F/F 305 operated synchronously with the GCLK, and then input to #0~#7 memory control signal generation circuits 307 operated synchronously with the FCLK through a selection circuit (SEL) 306. An F/F 309 is described later. As a result, memory control signals such as negative logic RAS signals, etc. are provided for any of RAMs 301 from any of the #0~#7 memory control signal generation circuits 307 synchronously with the FCLK.

The #0~#7 RAMs 301 comprise DRAMs. The RAMs 301 activated by the memory control signal generation circuits 307 output 8-byte read data RD consecutively 8 times synchronously with the FCLK in the consecutive access mode after the cycle time of the RAMs 301 has passed. The read data RD are output to a single read signal line connected to #0~#7 read data registers MDR 302 based on the DOT logic, etc.

When a read data selection signal RDSEL is output from a 3-bit counter (not shown in FIG. 4) which operates synchronously with the FCLK and is decoded by a decoder (DEC) 308, read data set signals RDST 0–7 output from the DEC 308 become active sequentially.

As a result, 8 pieces of read data RD output from any of the RAMs 301 are sequentially stored in the #0 ~#7 MDRs 302.

When selection data are output from a 3-bit counter (not shown in FIG. 4) which operates synchronously with the GCLK and are decoded by a decoder (not shown in FIG. 4), selection signals DMPX_RD 0–7 to be sequentially active are provided by the decoder for a selection circuit (SEL) 303. As a result, an output of each of the 8 MDRs 302 is selected by the SEL 303 and output to the storage control device (not shown in FIG. 4) as 8 pieces of 8-byte read data MRD through an F/F 304 and a read data bus (not shown in FIG. 4) which operate synchronously with the GCLK and have the data width of 8 bytes.

Thus, according to the configuration shown in FIG. 4, a single read instruction FCH 64 outputs 64 -bytes (8 bytes×8 pieces) read data from the main storage device via a read data bus of 8-byte data width. Accordingly, the single read instruction FCH allows the read data bus to be occupied for the time 8τ, where τ indicates the cycle of the GCLK and is equal to the cycle of the FCLK in the normal clock mode. When the read instruction FCH 64 is provided for the main storage device, the storage control device (not shown in FIG. 4) is suspended for 8τ from the issue of the first request REQ 0 of the read instruction FCH 64 to the issue of the second request REQ 1 of the read instruction FCH 64 as shown in FIGS. 5A–5C.

In FIG. 4, 8 RAMs 301 are provided for a set of 8 MDRs 302. This configuration does not directly relate to the present invention described later. It is so designed because the cycle of the DRAMs forming the RAMs 301 is almost double the access time of the storage control device to the main storage device, and therefore a main storage device normally comprises a plurality of RAMs to secure the throughput. If the cycle of a single RAM group 301 is longer than 8τ, then a plurality of RAM groups 301 are provided and the read instruction FCH 64 is issued for each of the RAM groups 301 at every 8τ, thereby obtaining memory read data MRD in series. If, by contrast, the cycle of a single RAM group 301 is shorter than 8τ, then the read instruction FCH 64 is issued to the same RAM group 301 at each 8τ, thereby obtaining memory read data MRD in series. Thus, the present invention described later relates to a memory control method in which activation intervals of the RAMs are determined according to the amount of data read from the main storage device by a single read instruction FCH and the data transfer width of a read data bus regardless of the parameters indicating the access time of the RAMs 301, the cycle of the RAMs 301, etc.

FIGS. 5A–5C show an example of an operation timing of the main storage device shown in FIG. 4 in a normal clock mode. In FIGS. 5A–5C, the clock timing of the GCLK equals that of the FCLK (in the normal clock mode) at 0τ~21τ.

First, a request REQ0 of the read instruction FCH 64 is issued to the RAMs 301 in bank 0 at 0τ as shown in FIG. 5A. Then, memory control signals such as negative logic RAS signals are provided for the RAMs 301 in bank 0 at 1τ as shown FIG. 5B. As a result, 8 pieces of read data RD corresponding to the request REQ 0 of the read instruction FCH 64 are read from the RAMs 301 of bank 0 and are sequentially stored in the #0~#7 MDR 302 at 9τ~16τ. Then, as shown in FIG. 5A, the 8 pieces of the memory read data MRD are sequentially output to the read data bus at 10τ~17τ. Thus, the time 17τ is required to output all 8-byte data specified by the read instruction FCH 64 as memory read data MRD since the read instruction FCH 64 has been entered. The required time is referred to as a read cycle.

While the above described operation is being performed, the second request REQ 1 is issued to the RAMs 301 in bank 1 at 8τ, that is, 8τ after the first request REQ 0 has been issued at 0τ for the read instruction FCH 64 as shown in FIG. 5A. Then, the memory control signals such as the #1 negative logic RAS signal, etc. are provided for the RAMs 301 in bank 1 at 9τ as shown in FIG. 5B. As a result, at 17τ~24τ, 8 pieces of read data RD specified by the request REQ 1 of the read instruction FCH 64 are read from the RAMs 301 in bank 1 and sequentially stored in the #0–#7 MDRs 302. Then, as shown by in FIG. 5C, 8 pieces of memory read data MRD are sequentially output via a read data bus at 18τ~25τ after 10τ~17τ when memory read data MRD specified by the request REQ 0 of the read instruction FCH 64 are output.

However, the above described third prior art has the following problem.

As mentioned above, after the F/F 305 in the main storage device shown in FIG. 4 has received the first request of the read instruction FCH 64 from the storage control device (not shown in FIGS. 5A–5C) at the 0-th GCLK, the RAMs 301 are activated through the memory control signal generation circuit 307 operating synchronously with the FCLK. As a result, 8 pieces of read data RD output from the RAMs 301 in series are stored in the #0–#7 MDRs 302. In the single clock mode, the cycle of the GCLK is much longer than the cycle of the FCLK as shown in FIG. 6A–6C. Accordingly, a negative logic RAS signal is generated according to the FCLK and input to the RAMs 301 based on the GCLK entered when the first request of the read instruction FCH 64 is issued as shown in FIGS. 6A–6D, and 8-byte read data RD output from the RAMs 301 are set in the MDR 302 synchronously with the FCLK. These operations are completed long before the next GCLK is entered. The first contents of the 8 pieces of the data stored in the MDR 302 are read when the 10th GCLK is entered based on the first entry of the request of the read instruction FCH 64 as shown in FIG. 6D. The last contents of the 8 pieces of the data stored in the MDR 302 are read when the 17th GCLK is entered based on the entry of the first request of the read instruction FCH 64 as described above.

When the 8th GCLK is entered based on the entry of the first request of the read instruction FCH 64, the next request of the read instruction FCH 64 is entered. As in the entry of the first request of the read instruction FCH 64, the RAMs 301 are activated synchronously with the FCLK and the contents of the 8 pieces of data in the MDR 302 are replaced with the data specified by the second read instruction FCH 64 before the 8 pieces of data in the MDR 302 specified by the first read instruction FCH 64 are output. Therefore, the data output from the MDR 302 after the 10th GCLK is input based on the entry of the first request of the read instruction FCH 64 are not the data specified by the first read instruction FCH 64, but those specified by the second read instruction FCH 64.

Since the third request of the read instruction FCH 64 is entered when the 16th GCLK is entered based on the entry of the first request of the read instruction FCH 64, the data output from the MDR 302 when the 17th GCLK is entered based on the entry of the first request of the read instruction FCH 64 are not the data specified by the first read instruction FCH 64, but those specified by the third read instruction FCH 64.

Thus, if the main storage device is operated in the single clock mode according to the third prior art without any modification, then the memory read data MRD specified by each request of the read instruction FCH 64 cannot be output correctly.

To avoid the problem, a subsequent instruction cannot be entered after a read instruction is issued in the single clock mode until all of plural pieces of read data output in series from the RAMs in the main storage device have been completely stored in the buffer (F/F) which is operated synchronously with the GCLK and located first at the output side of the main storage device. The stop time equals the above described read cycle, that is, 7τ (GCLK) in the case of the configuration shown in FIG. 4. With this configuration, as described above, a single read instruction FCH 64 outputs read data comprising 8 bytes×8 pieces=64 bytes via a read data bus of an 8-byte data width, and a single read instruction FCH 64 occupies the read data bus for 8τ. Therefore, the storage control device outputs the read instruction FCH 64 at intervals of 8τ. Thus, the maximum number of the read instructions input to the main storage device within the read cycle is 3.

Based on the consideration above, the shift registers 309 are provided conventionally as shown in FIG. 4 to delay the entry of the read instruction FCH 64 to the RAMs 301 by the time corresponding to the above mentioned read cycle.

With the configuration, a single clock mode notice signal (SINGM) is input to the SEL 306 from the clock control unit (not shown in FIG. 4) provided in, for example, the storage control device in advance by the time equal to the read cycle before the main storage device enters the single clock mode. After the entry of the signal, the SEL 306 selects the output of the shift registers 309, not the output of the F/F 305. Simultaneously, the shift registers 309 are provided with the GCLK for their operations. Afterwards, the read instruction FCH 64 input to the main storage device is delayed by the time equal to the read cycle by the shift registers 309, and then entered in the memory control signal generation circuit 307. Thus, the memory control signal generation circuit 307 operated synchronously with the FCLK and the RAMs 301 are activated after being delayed by the time equal to the read cycle. Accordingly, memory read data MRD can be output correctly according to each of the read instructions FCH 64.

If the operation of the main storage device is returned from the single clock mode to the normal clock mode, a clock is switched from the GCLK to the FCLK to operate the shift registers 309, and then the read instruction FCH 64 in the shift registers 309 is output to the memory control signal generation circuit 307 through the SEL 306, and the single clock mode notice signal (SINGM) entered in the SEL 306 is nullified. Thus, data can be prevented from being lost when the single clock mode is switched to the normal clock mode.

However, the above described prior art has the serious problem of a complicated circuit configuration because it needs entering a control signal line such as a single clock mode notice signal (SINGM) from a clock control unit provided in, for example, the storage control device to the main storage device.

Furthermore, the state transition of, for example, the main storage device is performed between the single clock mode and the normal clock mode under undesirably complicated timing control according to the above explained prior art, thereby causing a problem of difficult timing change.

Since the operations of the main storage device are different between the normal clock mode and the single clock mode, it is very difficult to analyze in the single clock mode the faults in the main storage device which has occurred in the normal clock mode.

SUMMARY OF THE INVENTION

The present invention aims at solving the problem occurring when a memory is operated in a consecutive access mode, that is, the problem that the access efficiency is reduced when access is made in the consecutive access mode to the main storage device to which a buffer storage device is connected, and the problem that the main storage device operating in the consecutive access mode cannot be operated in the single clock mode in the same manner as in the normal clock mode.

The present invention is designed to access L-byte (for example, 64-byte) data specified by a data transfer instruction by dividing the L-byte data in the data of S bytes (for example, 64 bytes), where S is a multiple of B (for example, 8-byte) which refers to a memory activation unit. The L-byte data are allocated to a plurality of memories, and the memories are accessed for respective S-byte data in a consecutive access mode.

BRIEF DESCRIPTION OF THE DRAWINGS

FIGS. 20A–20H are timing charts showing the operation of the sixth embodiment.

DESCRIPTION OF THE PREFERRED EMBODIMENTS

Figure 7:
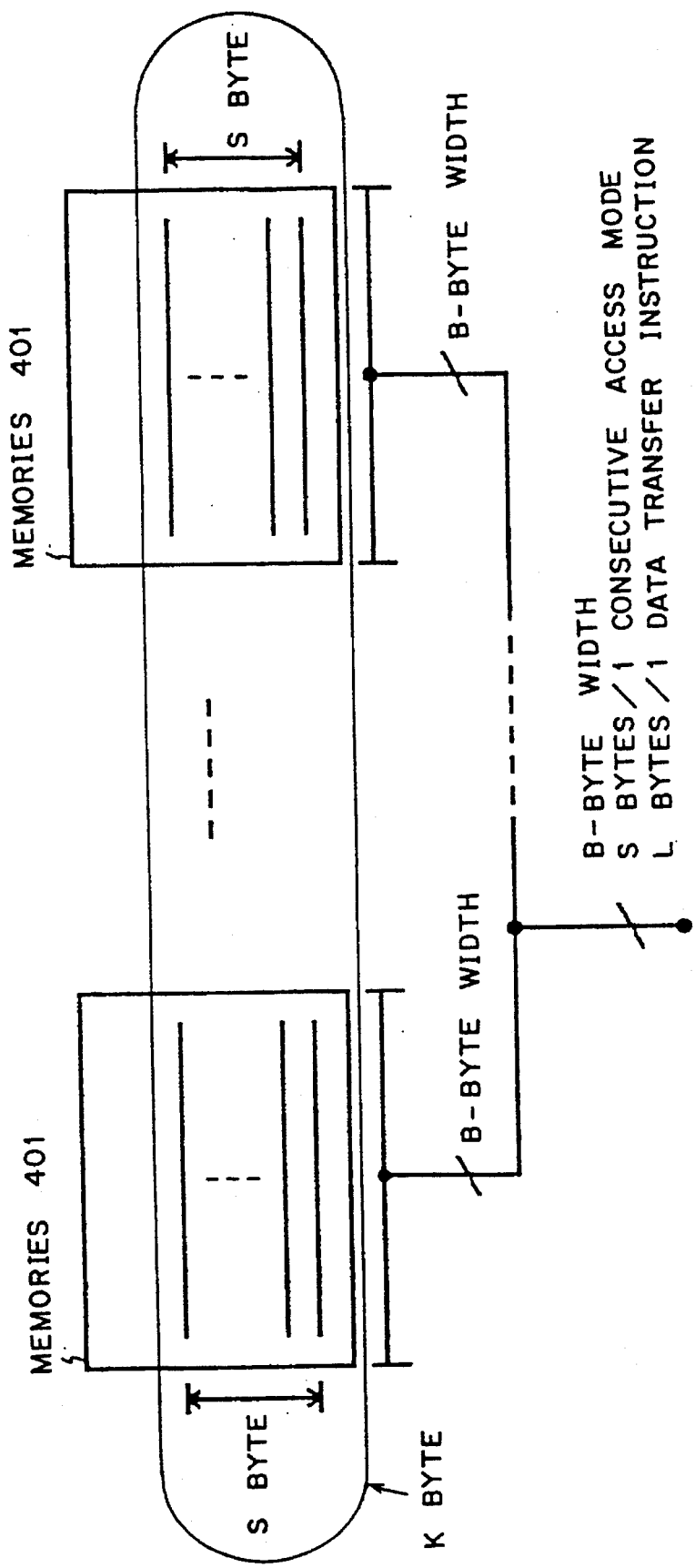
FIG. 7 is a block diagram illustrating the principle of the first aspect of the present invention.

FIG. 7 is a block diagram illustrating the principle of the first aspect of the present invention.

The first aspect of the present invention discloses a storage system designed as a 3-layer-storage system, that is, a buffer storage device (cache memory) having a small storage capacity and operating at a high speed in the central processing unit, an intermediate buffer storage device (secondary cache memory) having an medium-size storage capacity and operating at a moderate speed in a storage control device, and a main storage device having a large storage capacity and operating at a relatively slow speed. In response to a data transfer request to transfer data of the first unit (K bytes, for example, 512 bytes) where the data are stored in series in an address space, the data are divided in the second units (in L-byte units, for example, in 64-byte units) where the second unit is a divisor of the first unit. The data of the second unit are assigned priority levels, and a data transfer instruction to transfer the data of the second unit (L bytes) is issued plural times to a memory device comprising a plurality of memories 401 (for example, RAMs 701 to be described later) operable in the consecutive access mode. Thus, the memories are accessed according to a data transfer request to transfer data of the first unit (K bytes).

According to the first aspect, the present invention is designed to access data of the second unit (L bytes) specified by a data transfer instruction by dividing the data in the third unit (S bytes, for example, equal to L bytes) which is equal to the second unit or obtained by dividing the second unit, and is more than double the activation unit (B bytes, for example, 8 bytes) of the memories 401. The data are allocated to the memories 401 of the number obtained by dividing the first unit (K) by the third unit (S) or of a smaller number.

Then the data of the third unit (S bytes) are accessed in the memories 401 in the consecutive access mode.

Figure 8:
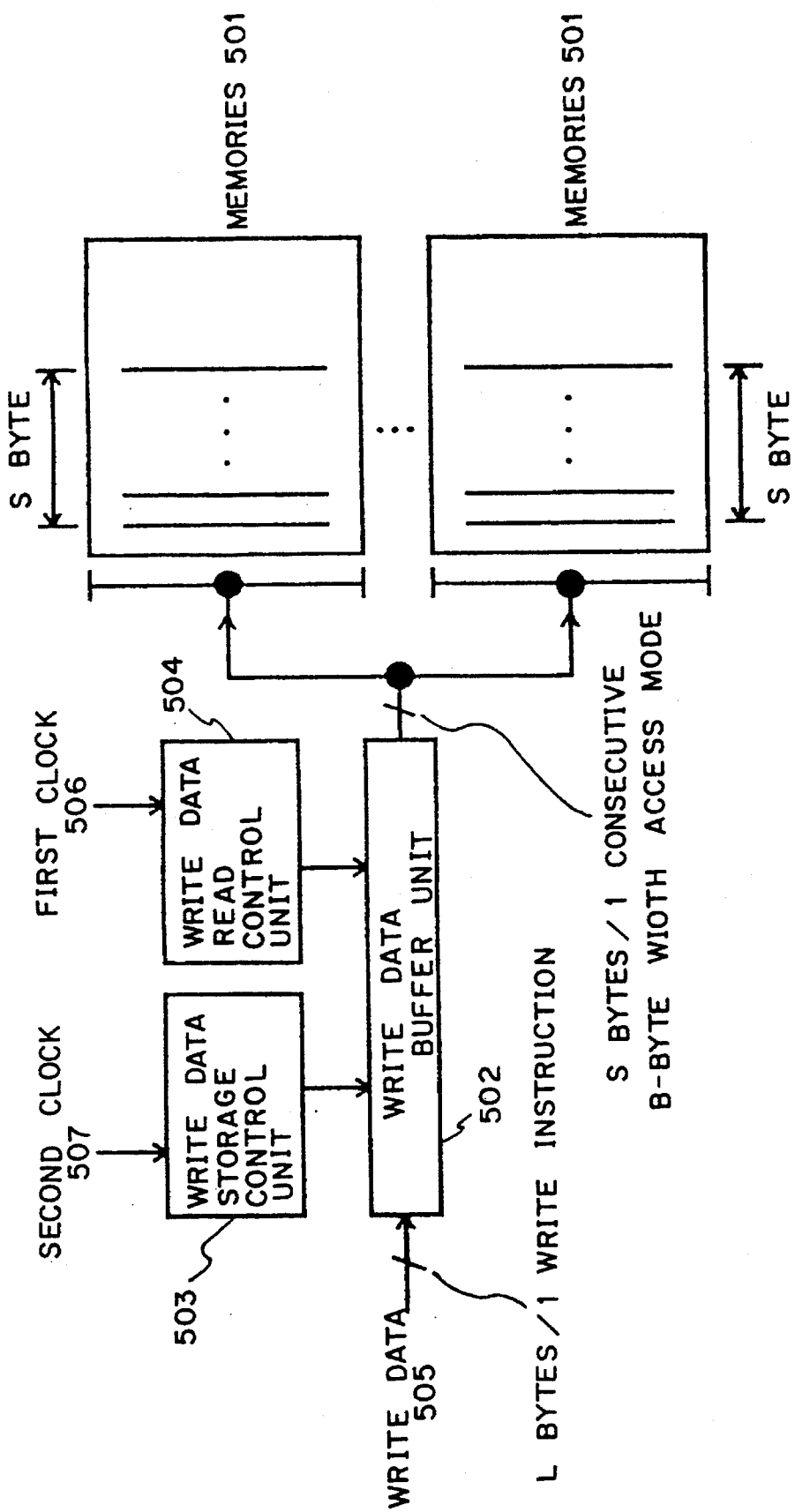
FIG. 8 is a block diagram illustrating the principle of the second aspect of the present invention.

FIG. 8 is the block diagram illustrating the principle of the second aspect of the present invention.

The second aspect of the present invention relates to a memory control system in which data are written to a memory device comprising a plurality of memories 501 (for example, RAMs 809 to be described later) which are accessed synchronously with a first clock 506 (for example, a free run clock FCLK) operating ceaselessly in each operation state, and are operated in the consecutive access mode. For more practical example, in response to a data transfer request to transfer data of the first unit (K bytes) stored in series in an address space, the data are assigned priority levels in the second units (L-byte units) where K is a multiple of L as in the first aspect of the present invention. A data transfer instruction to transfer data of the second unit (L bytes) are issued plural times to a memory device comprising a plurality of memories 501 which are accessed synchronously with the first clock 506 operating ceaselessly in each operation state, and are operated in the consecutive access mode. Thus, memories are accessed according to a data transfer request to transfer data of the first unit (K bytes).

First, the present invention comprises a write data buffer unit 502 (for example, a WD_REG 804) for storing at least write data 505 of the fourth unit (S bytes, for example, 64 bytes), that is, an access unit in the consecutive access mode. The fourth unit (S-byte) is equal to the second unit (L bytes) or the unit obtained by dividing the second unit, and is a multiple of the activation unit (B bytes) of the memories 501 as in the first aspect.

The present invention further comprises a write data storage control unit 503 (for example, a 3-bit counter 813 and a DEC 806) for sequentially storing the write data 505 transferred synchronously with a second clock 507 (for example, a gated clock GCLK) according to a write instruction in the write data buffer unit 502 synchronously with a second clock 507.

The present invention also comprises a write data read control unit 504 (for example, 3-bit counters 814 and 816, a differentiation circuit 815, and a DEC 807 to be described later) for reading, when the write data 505 of the fourth unit (S bytes) are stored in the write data buffer unit 502, the stored write data 505 of the fourth unit (S bytes) in the consecutive access mode synchronously with the first clock 506 and for transferring them to any of the memories 501.

The configuration according to the second aspect of the present invention can also be designed to comprise two sets of the write data buffer units 502 and the following switching unit (for example, a inverting F/F 901 and a selection circuit 902). That is, the switching unit has the write data storage control unit 503 control the storage of the write data 505 of the fourth unit (S bytes) in one of the write data buffer units 502. It also has the write data read control unit 504 read the write data 505 of the fourth unit (S bytes) from the other write data buffer unit 502 to the memories 501. When the write data storage control unit 503 and the write data read control unit 504 have finished the process for the write data 505 of the fourth unit (S bytes), the write data storage control unit 503 and the write data read control unit 504 switch their write data buffer units 502.

In the configuration according to the second aspect of the present invention, the data bus connected to the memory device is a two-way bus commonly used to transfer read data and the write data 505. The system according to the second aspect further comprises a timing signal generating unit (for example, an FCLK trigger circuit 1020) for generating a timing signal which becomes active synchronously with the first clock 506 when the second clock 507 indicates a change. The write data buffer unit 502 and the write data storage control unit 503 can be designed as follows. That is, the write data buffer unit 502 comprises a data buffer unit (for example, a DR 1001 to be described later) for storing data synchronously with the first clock 506. Then, the write data storage control unit 503 sequentially stores the write data 505 transferred via a data bus synchronously with the second clock 507 in the data buffer unit according to the write instruction synchronously with a timing signal generated by a timing signal generating unit. Then, the data buffer unit forming part of the write data buffer unit 502 is also used as a read data buffer unit when the data read from the memories 501 synchronously with the first clock 506 are read to the data bus synchronously with the second clock 507.

Additionally, the system according to the second aspect of the present invention further comprises a timing signal generating unit (for example, a differentiation circuit 1102) for generating a timing signal which becomes active synchronously with the first clock 506 when the second clock 507 indicates a change. The write data storage control unit 503 can be designed to sequentially store the write data 505 transferred via a data bus synchronously with the second clock 507 in the write data buffer unit 502 according to the write instruction synchronously with a timing signal generated by a timing signal generating unit.

Figure 9:
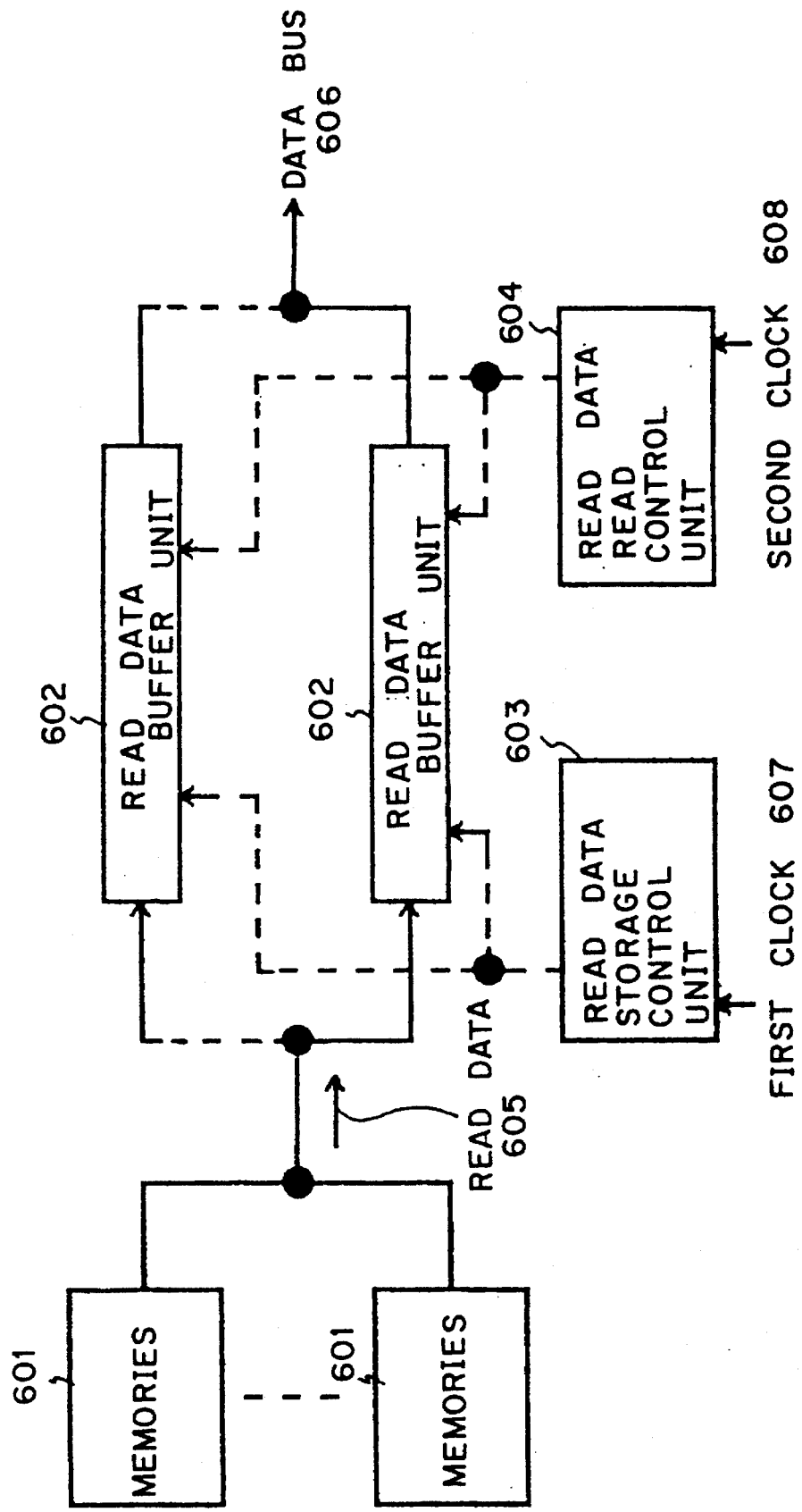
FIG. 9 is a block diagram illustrating the principle of the third aspect of the present invention.

FIG. 9 is a block diagram illustrating the principle of the third aspect of the present invention.

The third aspect of the present invention relates to a memory control system which stores in a read data buffer unit 602 (for example, an MDR 1202) the read data 605 activated by a read instruction synchronously with a second clock 608, and read from any of memories 601 (for example, RAMs 1201) forming part of the memory device in the consecutive access mode synchronously with a first clock 607 (for example, a free run clock FCLK) ceaselessly operating in an operation state. Then, the system outputs to a data bus 606 read data 605 stored in the read data buffer unit 602 synchronously with the second clock 608 (for example, a gated clock GCLK to be described later).

The system according to the third aspect further comprises the read data buffer units 602 to the number of sets larger than the number of the read instructions possibly input to the memory device while, after the first issue of a read instruction, all read data 605 consecutively output from the memories 601 are completely output from the read data buffer unit 602 to the data bus 606. Each set of the read data buffer units 602 has the size of storing the read data 605 consecutively output from the memories 601 activated by a single read instruction and operated in the consecutive access mode.

Then, the system comprises a read data storage control unit 603 (for example, a DEC 1204) for sequentially storing in each set of the read data buffer units 602 each set of the read data 605 read from any of the memories 601 in response to each read instruction synchronously with the first clock 607.

Additionally, the system comprises a read data read control unit 604 (for example, a SEL 1203) for sequentially outputting to the data bus 606 each set of the read data 605 sequentially stored according to each read instruction in each set of the read data buffer units 602 synchronously with the second clock 608.

The system according to the third embodiment of the present invention can further comprise the following first and second buffer set selecting units. That is, the first buffer set selecting unit sequentially and cyclically selects plural sets of the read data buffer units 602 synchronously with a read from the memories 601 of the read data 605 specified by an activated read instruction or of the read data 605 specified by an activated read instruction preceded by an executed read instruction each time a read instruction is activated and completes its process in the memory device. The second buffer set selecting unit sequentially and cyclically selects plural sets of the read data buffer unit 602 in the order in which the first buffer set selecting unit selected the read data buffer units 602 each time all read data 605 stored in the read data buffer unit 602 have been completely output to the data bus 606 in a set of the read data buffer unit 602.

At this time, the read data storage control unit 603 has the read data buffer unit 602 selected by the first buffer set selecting unit store the read data 605. The read data read control unit 604 has the read data buffer unit 602 selected by the second buffer set selecting unit output the read data 605 to the data bus 606.

In the above described configuration, the system can further comprise a counter unit (for example, a 3-bit counter 1210 to be described later), which increments a count value by one each time a read instruction is activated in a memory device or completely executed, for sequentially and cyclically specifying a plurality of read data buffer units 602. The first and second buffer set selecting units can be designed as follows. That is, the first buffer set selecting unit can comprise a first shift register unit (for example, an FCL_PIPE 1211) and a first switch unit (for example, a DEC 1212). The first shift register unit operates synchronously with the first clock 607 to delay an output of the counter unit by the period from a point when a read instruction is activated or completely executed in a memory to a point when the read data 605 specified by the activated read instruction or the read data 605 specified by the read instruction activated after the previously executed read instruction start being read from the memories 601. The first switch unit sequentially and cyclically inputs each set of the read data 605 read from the memories 601 to each of the plural sets of the read data buffer unit 602 according to an output of the counter unit output from the first shift register unit. The second buffer set selecting unit can comprise a second shift register unit (for example, a GCL_PIPE 1213) and a second switch unit (for example, a DEC 1214 and a SEL 1206). The second shift register unit operates synchronously with the second clock 608 to delay an output of the counter unit by the period from a point when a read instruction is activated or completely executed in a memory to a point when the read data 605 specified by the activated read instruction or the read data 605 specified by the read instruction activated after the previously executed read instruction start being read from any of the read data buffer unit 602. The second switch unit sequentially and cyclically selects each set of the read data buffer unit 602 according to an output of the counter output from the second shift register unit, and outputs the read data 605 stored in the selected read data buffer unit 602 to the data bus 606.

The above described first aspect of the present invention is realized as follows.

For example, if a block of the first unit (K bytes) is to be transferred between a memory device and an intermediate buffer storage device (not shown in the attached drawings) in response to a new request of the CPU for a specific block of the second unit (L bytes) during the (first unit/second unit (K/L))-time issues of write or read instructions to write or read a block of the second unit (L bytes) to the memory device, the storage control device (not shown in the attached drawings) suspends the (first unit/second unit (K/L))-time issues of the write or read instructions, and executes by priority the leading write or read instruction in the (first unit/second unit (K/L))-time issues of the write or read instructions in response to the new request.

The memories 401 specified by the leading write or read instruction are probably the memories different from those that have been accessed. If so, no consideration of the idle time of the memories 401 is required, and the newly accessed memories 401 can be activated immediately.

That is, according to the first aspect of the present invention, blocks of the second-unit (L bytes) data are obtained by dividing blocks of the first-unit (K bytes) data, are assigned to the memories 401, thereby preventing the probability of accessing the same memories 401 repeatedly even if a plurality of the second-unit (L bytes) data blocks are to be transferred simultaneously according to respective transfer instructions. As a result, an average activation time of the memories 401 can be successfully shortened to realize a high-throughput memory device.

Described below is the operation according to the second aspect of the present invention.

That is, when the fourth-unit (S bytes) write data are prepared for an operation in a consecutive access mode, the memories 501 operating synchronously with the second clock 507 are activated according to the second aspect of the present invention. The system prevents invalid data from being written to the memories 501 even when the memory device having the configuration in FIG. 8 are operating in a single clock mode.

According to the second aspect of the present invention, the activation of the memories 501 are considerably delayed in a single clock mode. Since the delay can be recognized in the memory device only, it does not affect the entire throughput of the computer system. Furthermore, the operation in the normal clock mode can be guaranteed in the single clock mode according to the second aspect.

Since two sets of the write data buffer units 502 are provided according to the second aspect of the present invention, write data are output from one write data buffer unit 502 which has completed a writing operation to the memories 501 while write data are being written to the other write data buffer unit 502. As a result, each write instruction and the specified write data can be consecutively transferred without delay.

Furthermore, if the data bus connected to the memory device is a two-way bus commonly used for transfer of read data and write data according to the second aspect of the present invention, a single data buffer can provide a write data buffer unit and read data buffer unit in common. In this case, write data are stored in the data buffer unit according to a timing signal which becomes active synchronously with the first clock 506 when the second clock 507 indicates a change. When read data are stored, the data buffer operating synchronously with the first clock 506 are used to store write data.

According to the second aspect of the present invention, the write data storage control unit 503 sequentially stores the write data 505 transferred via a data bus synchronously with the second clock 507 in the write data buffer unit 502 synchronously with a timing signal which becomes active synchronously with the first clock 506 when the second clock 507 generated by the timing signal generating unit indicates a change. Thus, the write data buffer unit 502 can be designed as a circuit operating according to the first clock 506 only. Therefore, externally providing a simple timing signal generating unit allows the write data buffer unit 502 to comprise a general-purpose data register file operated according to a clock of a single type.

Described below is the operation according to the third aspect of the present invention.

A read instruction activates the memories 601 without delay in a memory device, and each set of the read data 605 consecutively read is stored in each set of the read data buffer units 602 under control of the read data storage control unit 603. Therefore, if the memory device is operated in the single mode, and even if a plurality of new read instructions are input to the memory device to activate the memories 601 and to newly read sets of the read data 605, the data sets can be sequentially stored in other sets of the read data buffer units 602, thereby preventing the read data from being incidentally lost.

Even if the memory device is operated in either a normal clock mode or a single clock mode, a read instruction activates the memories 601 without delay in the memory device. That is, since the operation of the memory device in the normal clock mode is the same as that in the single clock mode according to the third aspect of the present invention, the faults generated in the normal clock mode in the memory device can be easily analyzed in the single clock mode.

An embodiment of the present invention is described in detail by referring to the attached drawings.

Figure 10:
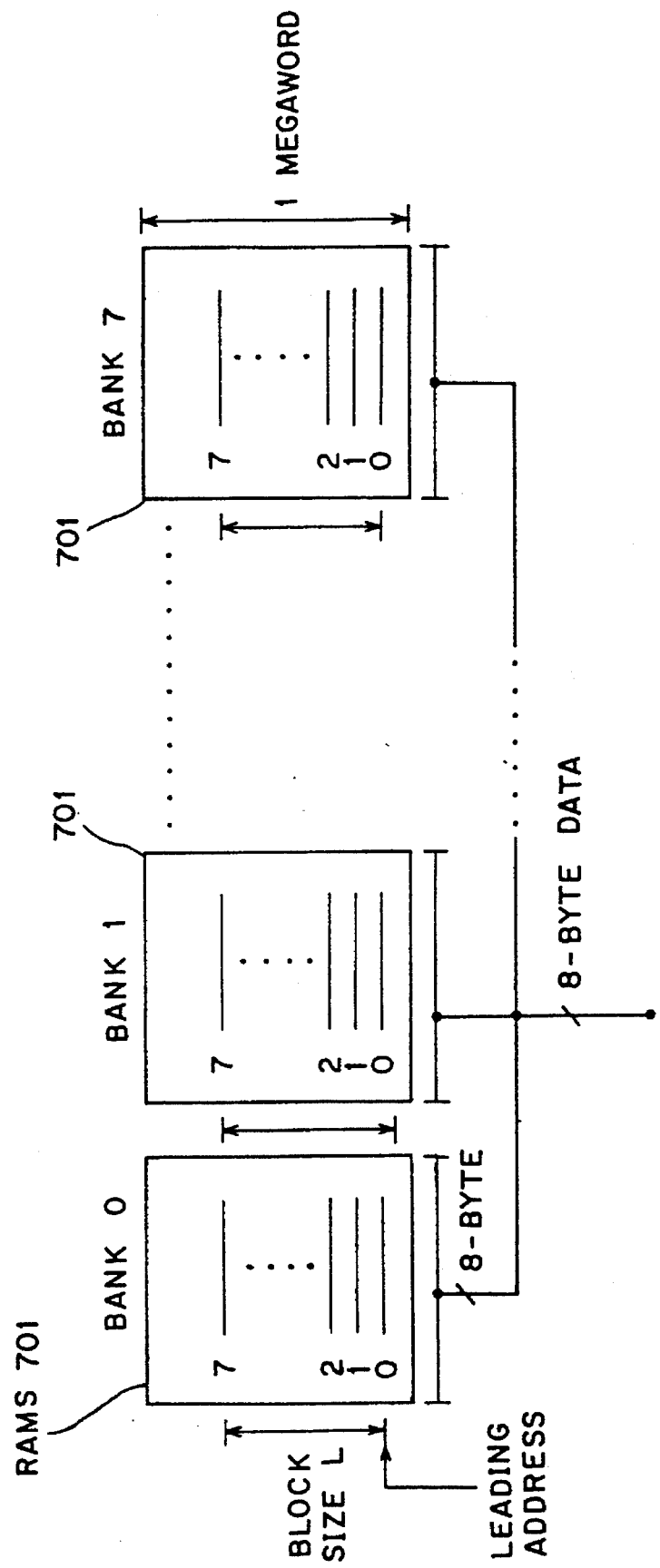
FIG. 10 shows the configuration according to the first embodiment of the present invention.

FIG. 10 shows the configuration of the main storage device according to the first embodiment of the present invention. This embodiment aims at solving the problem pertaining to the first prior art in the above described first technological field.

In FIG. 10, the access unit (word) to the main storage device is 8 bytes. The main storage device comprises 8 sets of the RAMs 701, that is, banks 0–7. Assuming that the block size K of the data transferred between the above described main storage device and the intermediate buffer storage device (not shown in the attached drawings) is, for example, 512 bytes, and that the block L=S is obtained as, for example, 64 bytes by dividing the K=512-byte data block, required are K/S=8 sets of the RAMs 701. One set of the RAMs 701 comprises a DRAM chip having the storage capacity of 1 megaword as shown in FIG. 10. Accordingly, the main storage device shown in FIG. 10 has a total of the following storage capacity.

8 bytes×1 megaword×8 banks=64 megabytes
where the block size K of the data transferred between the above described main storage device and the intermediate buffer storage device (not shown in the attached drawings) is, for example, 512 bytes, and a set of the RAMs 701 store data in, for example, L=64-byte (=8 words) units by dividing the K=512-byte block.

As in the first prior art, the storage control device (not shown in the attached drawings) does not issue a single write or read instruction, but issues K/L =512/64=8 times a write or read instruction to write or read L=64-byte data block. Such a configuration is desirably adopted because the response of the storage system can be greatly improved by moving in by priority according to the first read instruction from the main storage device to the intermediate buffer storage device the L-byte data to be immediately moved in from the intermediate buffer storage device to the buffer storage device in the CPU.

A control circuit (not shown in the attached drawings) in the main storage device shown in FIG. 10 controls each of the RAMs 701 at the address specified by a write or read instruction sent from the storage control device. The address refers to the leading address of L (for example, 64)-byte write or read data. Based on the value of the bank address part in the leading address, one of the RAMs 701 in banks 0–7 is selected and activated. Simultaneously, the RAM address part in the address is output to the RAMs 701 in banks 0–7 and set in the address register in the activated RAMs 701.

The RAMs 701 is operated in the consecutive access mode.

That is, the activated RAMs 701 increments by 1 the value of the address register synchronously with a CAS signal 8 times repeatedly.

If the storage control device issues a write instruction, then the activated RAMs 701 writes 8-byte write data transferred from the storage control device to the cell specified by a value of the address register each time an updating operation is performed. By performing the operation 8 times repeatedly for a single write instruction, L=64-byte data block is written to the activated RAMs 701.

If the storage control device issues a read instruction, then the activated RAMs 701 read 8-byte read data from the cell specified by a value of the address register each time an updating operation is performed, and outputs it to the storage control device. Performing this process 8 times repeatedly for a single read instruction allows an L=64-byte data block to be read from the activated RAMs 701.

If a new K=512-byte data block is to be transferred between the main storage device and the intermediate buffer storage device in response to a request for an L-byte data block from a CPU while a write or read instruction to write or read an L=64-bytes data block is issued 8 times to the main storage device, then the storage control device suspends the K/L=8-time issues of the write or read instructions, and executes by priority the leading write or read instruction in the K/L=8-time write or read instructions to transfer the newly requested block.

The RAMs 701 specified by the leading write or read instruction is possibly different from the RAMs 701 being accessed. If the newly accessed RAMs 701 are different from the previously accessed RAMs 701, then required is no consideration of the idle time of the DRAM forming part of the RAMs 701. Therefore, the RAMs 701 to be accessed can be accessed immediately. That is, according to the first embodiment, L=64-byte block data are obtained by dividing a K=512-byte block data and are assigned to the RAMs 701, thereby the possibility of consecutively accessing the same RAMs 701 can be avoided even if transfer instructions are issued to transfer a plurality of L=64-byte data blocks in response to requests from a plurality of CPUs. As a result, an average time of the activation of the RAMs 701 can be shortened, and a high-throughput main storage device can be realized. On the other hand, unless a new request is issued from another CPU, the K/L=8-time write or read instructions can be issued consecutively, thereby completing a process of a single block within the shortest possible time.

In the above described first embodiment, K/L is 8, and 8 sets of the memories 401 in banks 0–7 are used. Actually, if L=64-byte data blocks are sequentially processed in the order of bank 0, bank 1, . . . , then bank 0 terminates its busy state when bank 2 or 3 is accessed, thereby permitting bank 0 to be accessed again. Accordingly, the throughput obtained in the first embodiment can be realized by designing 4 sets of the RAMs 701 to activate 2 times each for one set of the RAMs 701 in response to a transfer instruction to transfer an L=64-byte data block. That is, the number of banks can be reduced to smaller than K/L.

In the first embodiment of the present invention, the storage system having different sizes of blocks to be transferred between the buffer storage device and the intermediate buffer storage device and between the intermediate buffer storage device and the main storage device efficiently accesses the main storage device comprising a DRAM in a consecutive access mode. However, the first embodiment is simply an example of an application of the present invention. The present invention can be more generally applied to a technology of accessing (L×plural times)-byte data (can be different between CPUs) in the main storage device comprising a DRAM in the consecutive access mode in L-byte units.

Figure 11:
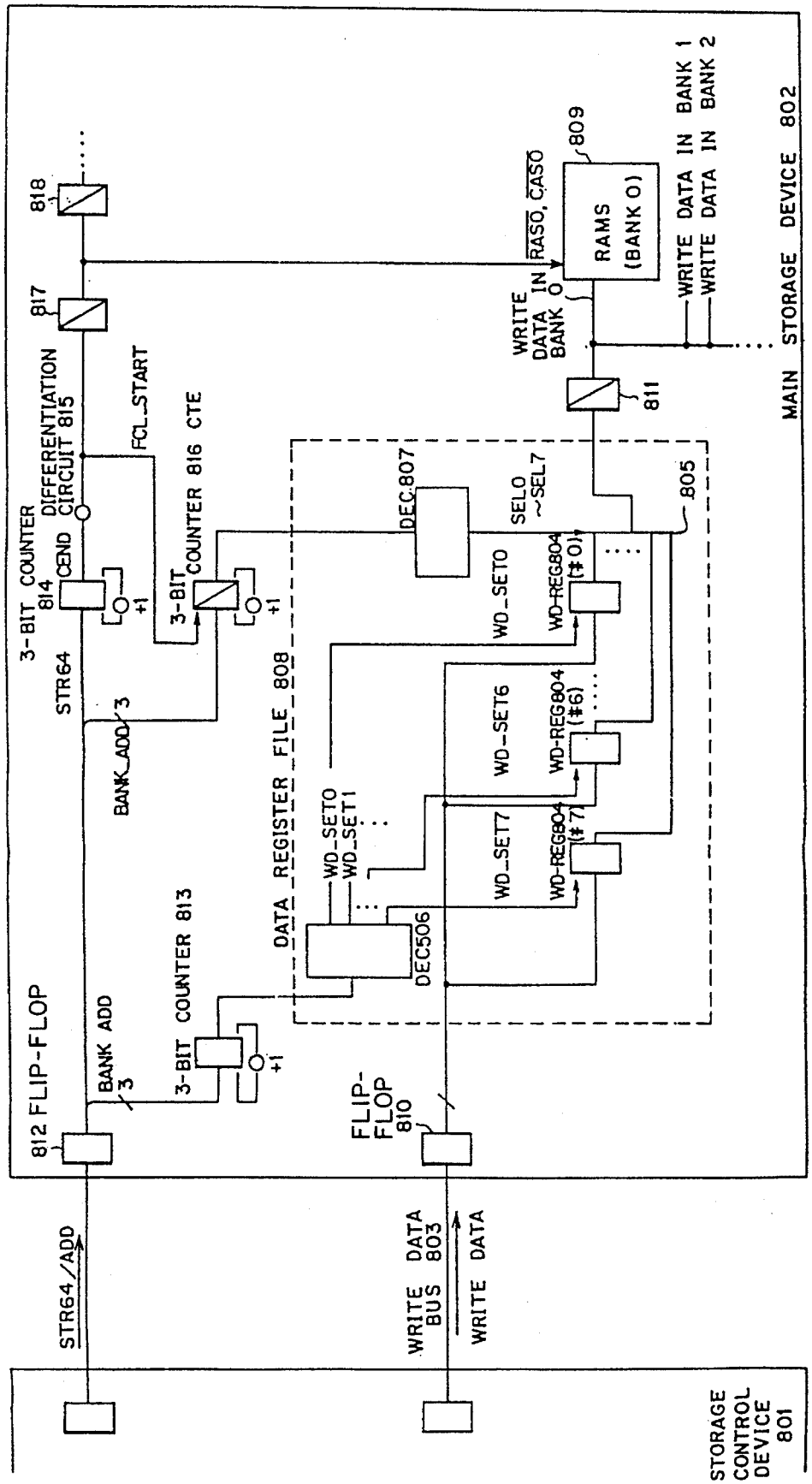
FIG. 11 shows the configuration according to the second embodiment of the present invention.

FIG. 11 shows the configuration of the second embodiment of the present invention. Practically, the embodiment solves the problem pertaining to the above described second prior art. The second embodiment is based on the configuration of the first embodiment.

That is, as in the case shown in FIG. 10, a set of RAMs 809 (only the RAMs 809 in bank 0 are shown in FIG. 11) in the main storage device 802 shown in FIG. 11 are accessed in, for example, L=64-byte (=8 word) data block units in the consecutive access mode.

Figure 1:
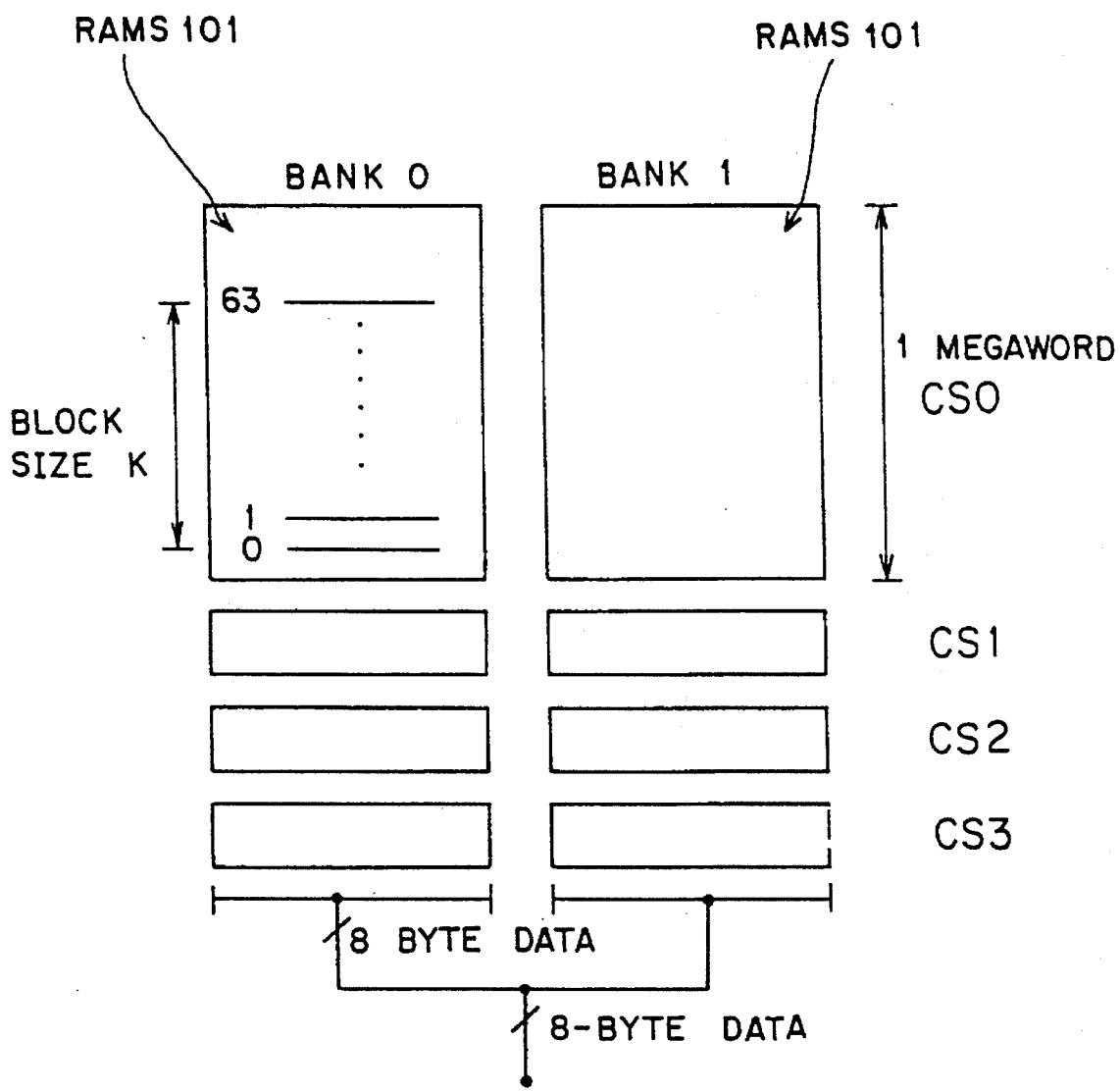
FIG. 1 shows the first prior art technology.
Figure 2:
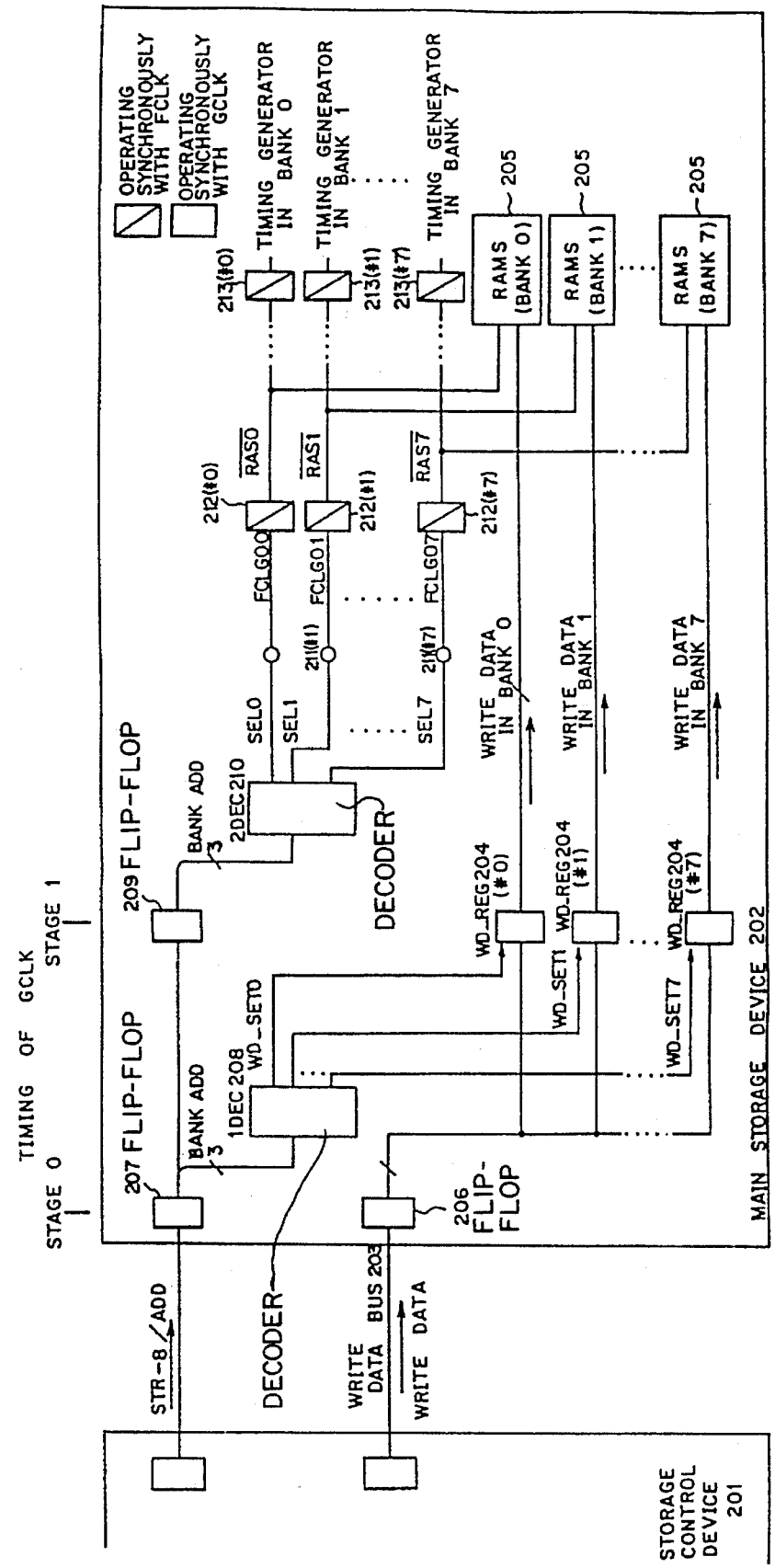
FIG. 2 shows the configuration according to the second prior art.
Figures 3A, 3B, 3C, 3D:
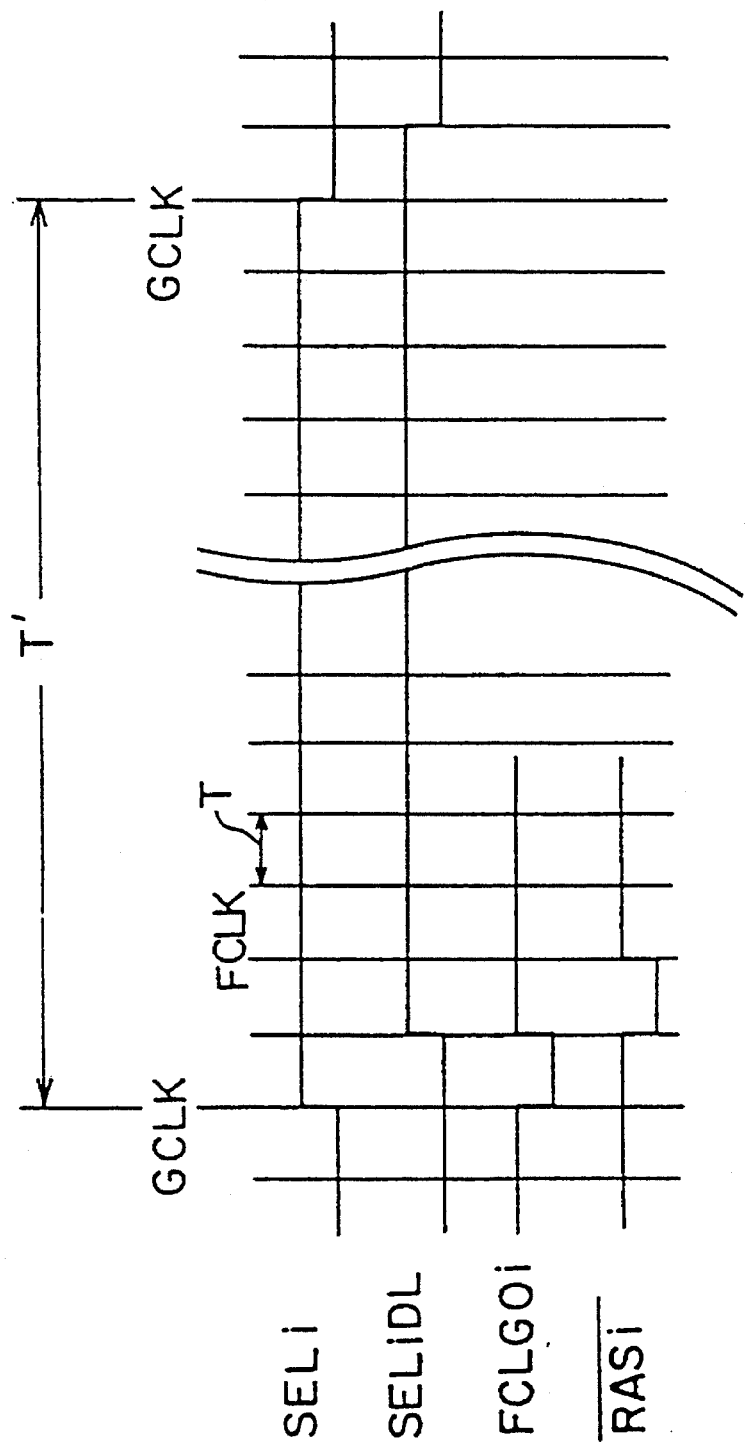
FIGS. 3A–3D are timing charts showing the operation in a single clock mode according to the second prior art.

With the above described configuration, as described by referring to the first embodiment, the number of banks of the RAMs can be reduced as compared with the above described second prior art shown in FIG. 2 by designing 4 sets of the RAMs 701 to activate 2 times each for one set of the RAMs 701 in response to a transfer instruction to transfer an L=64-byte data block. That is, the number of banks can be reduced to smaller than K/L If the number of the write data registers (WD_REG) for receiving write data from the storage control device is set to one for a group of the RAMs as in the second prior art shown in FIG. 2, then the following problem occurs. That is, if the main storage device of this configuration is operated in a single clock mode, the RAMs are activated when a piece (1 word=8 bytes) of write data from the storage control device are written to one WD REG synchronously with the GCLK. Then, the RAMs simultaneously perform write processes for 8 pieces (8 words) of data synchronously with the FCLK in the consecutive access mode, thus causing the serious problem that, in the data written to the RAMs, only the first 1 word is valid and the remaining 7 words are processed as invalid data.

To avoid the problem, provided are 8 WD_REGs 804 #0~#7 to store 8-word write data from the storage control device 801 according to the second embodiment shown in FIG. 11. After all the WD_REGs 804 have stored data, the RAMs 809 are activated. Although eight WD_REGs 204 #0~#7 are also provided according to the second prior art shown in FIG. 2, they are assigned to the eight RAMs 205 banks 0~7 and their functions are different from those of the WD_REGs 804 #0~#7 shown in FIG. 11. The eight WD_REGs 804, the decoders (DEC) 806 and 807, and the selection circuit 805 form part of a integrated circuit, for example, a data register file 808.

In FIG. 11, the write data for use in a write access to the main storage device 802 are transferred from the storage control device 801 to the main storage device 802 through a write data bus 803 provided between the storage control device 801 and the main storage device 802 as in the second prior art shown in FIG. 2. Each time the GCLK is entered, the write data of the amount depending on the bus width of a write data bus are transferred to the main storage device 802.

Assuming that, in this embodiment, the size L of a block transferred by a single write instruction is 64 bytes and that the data width of the write data bus 803 is 8 bytes, a set of a write instruction STR 64 and an address ADD are sent from the storage control device 801, and then 8-byte write data are sent from the storage control device 801 8 times synchronously with the GCLK.

With the configuration, if the first 8-byte write data in an L=64-byte data block are transferred together with the write instruction STR 64 and the address ADD synchronously with the GCLK from the storage control device 801 to the main storage device 802, then the write data are stored in a flipflop (F/F) 810 and the write instruction STR 64 and the address ADD are stored in an F/F 812 in the main storage device 802 synchronously with the first GCLK generated immediately after the start of the transfer (referred to as stage 0). At stage 0, the value of the 3-bit bank address part BANK ADD in the address ADD stored in the F/F 812 is input to the 3-bit counters 813 and 816 for incrementing their count values by 1 synchronously with the GCLK, and the write instruction STR 64 activates the 3-bit counter 814.

The 3-bit counter 813 outputs a value of the 3-bit bank address part BANK ADD at stage 0 only. Afterwards, it increments by 1 the value of the bank address part BANK ADD as an initial value each time the GCLK is input at subsequent stages 1~7. In the 3-bit counter 813, the count value returns to 0 if it has reached 7, and the counter counts from 0 again. The count value of the 3-bit counter 813 is decoded by the decoder (DEC) 806. As a result, write data set signals WD_SETi (i can be 0~7) for the above described count value become active sequentially, and the write data input from the storage control device 801 to the F/F 810 at stage 0~7 are sequentially stored in the #i WD_REG 804 for the write data set signals WD_SETi at stages 0~7.

For example, if the value of the bank address part BANK ADD is 0, and if the write data set signals WD_SET 0~WD_SET 7 sequentially become active at stages 0~7, then the 8-word write data transferred from the storage control device 801 are written in 8 WD_REGs 804 in the order of #0, #1, . . . , #7. If the value of the bank address part BANK ADD is, for example, 4, then the write data set signals WD_SETs 4~7 and WD_SETs 0~3 become active sequentially at stages 0~7, and then the 8-word write data are written to the 8 WD_REGs 804 in the order of #4, #5, #6, #7, #0, #1, #2, and #3.

On the other hand, the 3-bit counter 814 is activated by the write instruction STR 64, and outputs a count completion signal CEND after counting the input of 8 GCLKs. Therefore, the count completion signals CEND are output if all of the 8 WD_REGs 804 have stored the write data. The differentiation circuit 815 generates a write start signal FCL_START which becomes active at the rise of the count completion signal CEND. The write start signal FCL_START activates the 3-bit counter 816.

The 3-bit counter 816 outputs a value of the 3-bit bank address part BANK ADD at stage 0 only. Afterwards, it increments by 1 the value of the bank address part BANK ADD as an initial value each time the FCLK is input at subsequent stages 1~8. As in the 3-bit counter 813, the count value returns to 0 if it has reached 7, and the counter counts from 0 again in the 3-bit counter 816. The count value of the 3-bit counter 816 is decoded by the decoder (DEC) 807. As a result, the selection signals SELi (i can be 0~7) for the above described count value become active sequentially and synchronously with the FCLK, and the selection circuit 805 sequentially selects and outputs synchronously with the FCLK the write data output from the #i WD_REG 804.

For example, if the value of the bank address part BANK ADD is 0, and if the selection signals SEL 0~7 sequentially become active, then the selection circuit 805 selects and outputs the 8-word write data output from the 8 WD_REGs 804 in the order of #0, #1, #2, #3, #4, #5, #6, and #7 synchronously with the FCLK. If the value of the bank address part BANK ADD is, for example, 4, then the selection signals SELs 4~7 and 0~3 become active sequentially, and then the selection circuit 805 selects and outputs the 8-word write data output from the 8 WD_REGs 804 in the order of #4, #5, #6, #7, #0, #1, #2, and #3 synchronously with the FCLK.

The write data output from the selection circuit 805 are input to the RAMs 809 through an F/F 811 operating synchronously with the FCLK.

The write start signal FCL_START output from the differentiation circuit 815 is stored in an F/F 817 synchronously with the FCLK. Then, an output of the F/F 817 is provided for the RAMs 809 as a negative logic RAS signal. At the same time, the negative logic RAS signal is input to a timing generator (not shown in the attached drawings) through an F/F 818 operating synchronously with the FCLK. The timing generator generates a timing signal required by the RAMs 809 for a single writing operation synchronously with the FCLK. As a result, the write data input from the F/F 811 to the RAMs 809 are written to the RAMs 809 synchronously with the FCLK.

The circuit for selecting a plurality of the RAMs 809 are not shown in the attached drawings, but can be realized as a well-known circuit for generating a signal used in selecting the RAMs 809 based on an address ADD input to the F/F 812.

Thus, the RAMs 809 operating synchronously with the FCLK are activated when the entire 8-word write data are provided according to the second embodiment, thereby preventing invalid data from being written to the RAMs 809 even when the storage control device 801 and the main storage device 802 shown in FIG. 11 are operated in the single mode. According to the second embodiment, the RAMs 809 are activated with a considerable delay in the single clock mode. However, the delay is recognized by the main storage device 802 only, and does not affect the entire throughput of the computer system. Then, according to the second embodiment, the operation in the normal clock mode can be assured in the single clock mode.

FIGS. 12A–12F show an example of the timing of the operation of the main storage device 802 shown in FIG. 11 performed in the normal clock mode. In FIGS. 12A–12F, 0τ~18τ indicate clock timings of GCLK=FCLK (in the normal clock mode).

Figure 12:
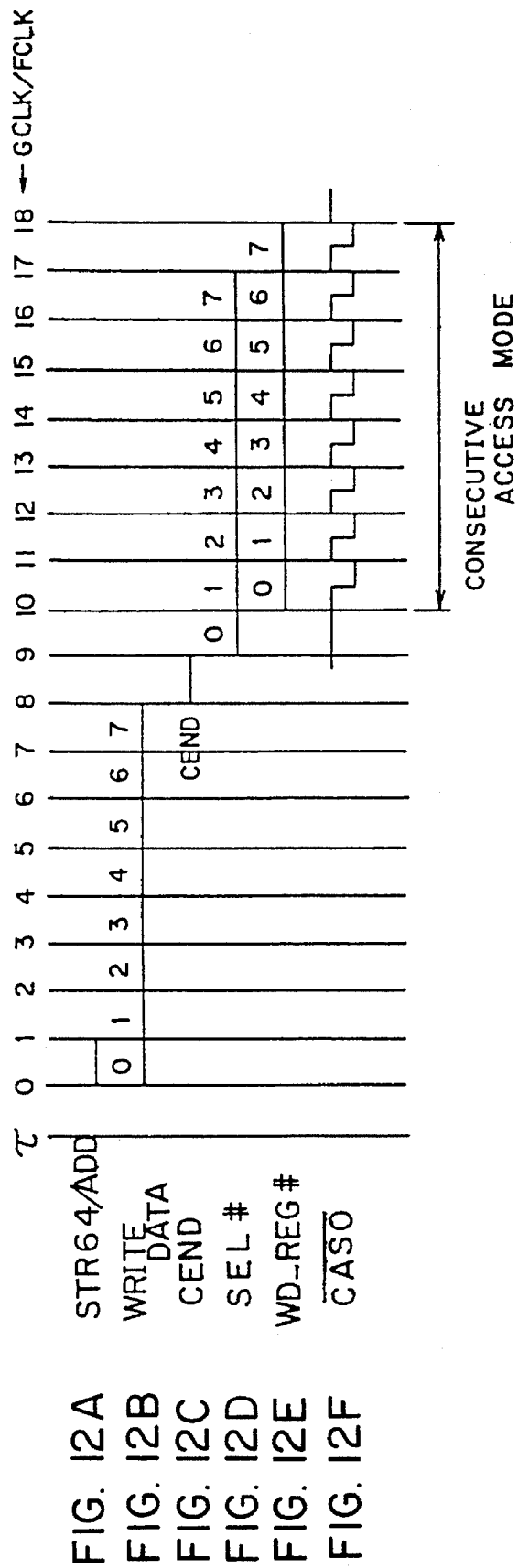
FIGS. 12A–12F are timing charts showing the operation according to the second embodiment in the normal clock mode.

As shown in FIG. 12A, the write instruction STR 64 and the address ADD are input to the F/F 812. At 0τ~7τ shown in FIG. 12B, the 8-word write data sequentially input from the storage control device 801 to the F/F 810 are sequentially stored in the 8 WD_REGs 804. As shown by in FIG. 12C, the count completion signal CEND becomes active at 8τ, and the 3-bit counter 816 starts its operation at and after 9τ. As a result, the selection signals SEL 0–7 become active sequentially at 9τ~16τ synchronously with the FCLK (=GCLK) as shown by, for example, in FIG. 12D. Thus, outputs of the WD_REGs 804 #0–#7 are sequentially selected by the selection circuit 805. As shown by, for example, in FIG. 12E, they are output from the F/F 811 to, for example, the RAMs 809 in bank 0 at 10τ~17τ synchronously with the FCLK (=GCLK). Afterwards, the RAMs 809 in bank 0 operate in the consecutive access mode. That is, as shown in FIG. 12F, an 8-pulse negative logic CAS signal is sequentially output from a timing generator (not shown in the attached drawings) at 10τ~17τ synchronously with the FCLK (=GCLK), thereby allowing the 8-word write data output from the F/F 811 as shown in FIG. 12E to be sequentially written to the RAMs 809 in bank 0.

FIGS. 13A–13F show an example of the operation timing for the main storage device 802 shown in FIG. 11 in the single clock mode. The main storage device 802 operates similarly in the single clock mode and the normal clock mode.

As shown in FIGS. 13A–13F, the cycle of the GCLK is normally longer than the cycle of the FCLK.

Figure 13:
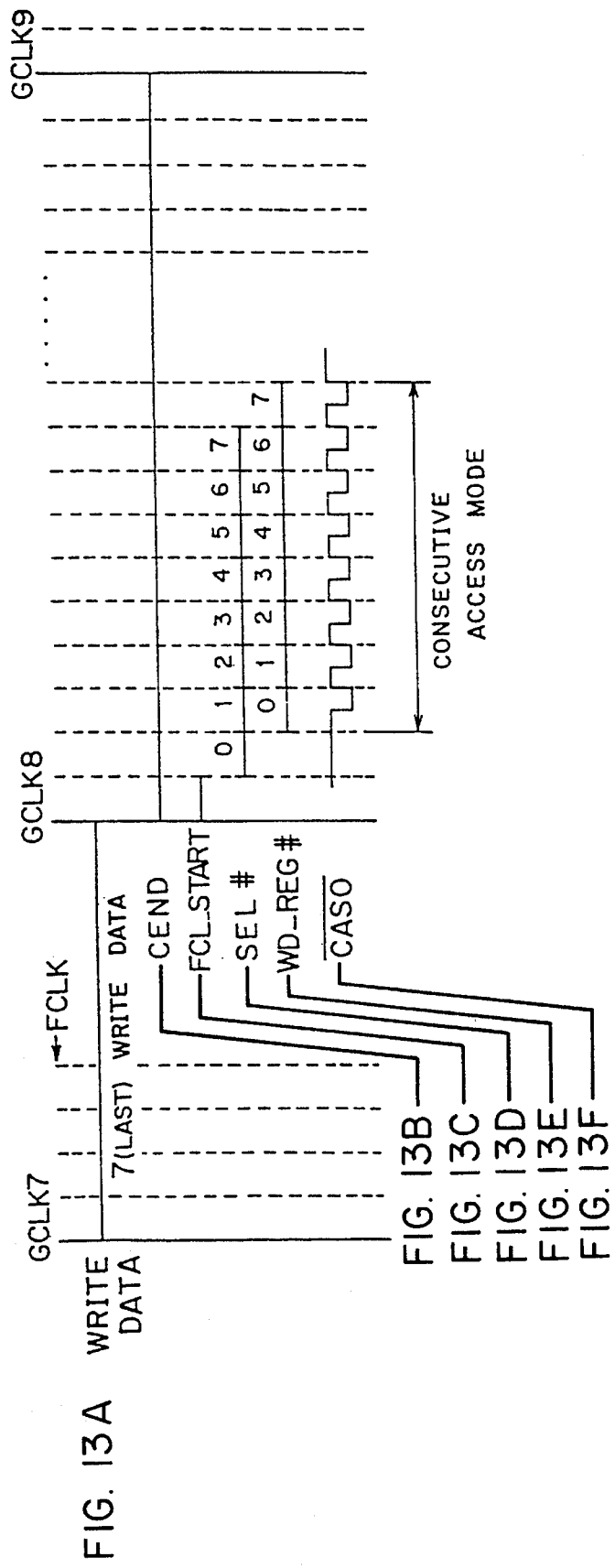
FIGS. 13A–13F are timing charts showing the operation according to the second embodiment in the single clock mode.

In the single clock mode, if all 8-word write data sequentially input from the storage control device 801 to the F/F 810 have been stored in the 8 WD_REGs 804 at GCLK 8 synchronous with the GCLK as shown by in FIG. 13A, then the count completion signal CEND becomes active as shown in FIG. 13B. As a result, a start signal FCL_START output from the differentiation circuit 815 becomes active at a point synchronous with the FCLK for the above described point GCLK 8 as shown in FIG. 13C. Afterwards, the 3-bit counter 816 starts its operation. As a result, the selection signals SEL 0–7 sequentially become active synchronously with the FCLK as shown in FIG. 13D. Therefore, outputs of the WD_REGs 804 #0–#7 are sequentially selected by the selection circuit 805, and output from the F/F 811 to the RAMs 809 in bank 0 synchronously with the FCLK as shown by, for example, in FIG. 13E. Afterwards, the RAMs 809 in bank 0 operates in the consecutive access mode synchronously with the FCLK. That is, an 8-pulse negative logic CAS signal is sequentially output by a timing generator (not shown in the attached drawings) synchronously with the FCLK as shown by in FIG. 13F, thereby sequentially writing to the RAMs 809 in bank 0 the 8-word write data output from the F/F 811 as shown in FIG. 13E. The writing operation terminates before the GCLK 9 after the GCLK 8.

Figure 14:
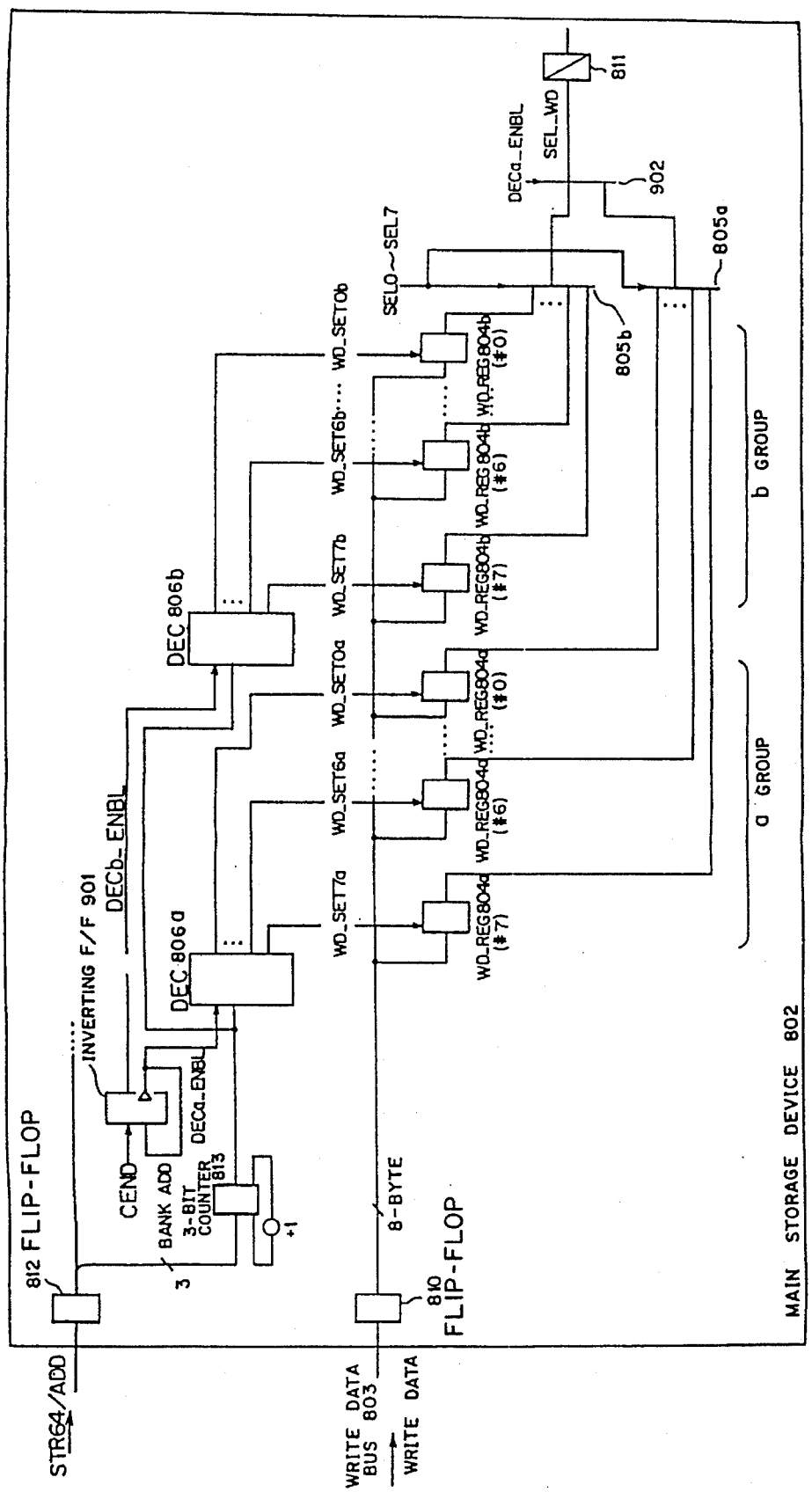
FIG. 14 shows the configuration according to the third embodiment of the present invention.

FIG. 14 shows the configuration according to the third embodiment of the present invention. The embodiment is to improve the performance realized by the above described second embodiment.

According to the second embodiment shown in FIG. 11, the storage control device 801 cannot write new 8 pieces of write data specified by the next write instruction STR 64 to the WD_REG 804 through the F/F 810 until the 8 sets of the write data stored in the 8 pieces of the write data registers (WD_REG) 804 have been output to the F/F 811.

On the other hand, according to the third embodiment indicated by the configuration shown in FIG. 14, the storage control device 801 allows the write instruction STR 64 to be issued consecutively without delay.

FIG. 14 shows the configuration of the important portion of the main storage device 802 in the third embodiment. In FIG. 14, the same identification number appearing in FIG. 11 refers to the same function. The distinct difference between the configuration shown in FIG. 14 and that shown in FIG. 11 is that 2 sets of the #0–#7 WD_REGs 804, selection circuit 805, and DEC 806 are provided as a and b groups in FIG. 14. The a group comprises a WD_REG 804a, selection circuit 805a, and DEC 806a. The b group comprises a WD_REG 804b, selection circuit 805b, and DEC 806b.

Writing the write data to the 8 pieces of WD_REG 804a according to the write data set signals WD_SET 0a~WD_SET 7a from the DEC 806a or writing the write data to the 8 pieces of WD_REG 804b according to the write data set signals WD_SET 0b~WD_SET 7b from the DEC 806b is the same as writing the write data to the 8 pieces of WD_REG 804 according to the write data set signals WD_SET 0~WD_SET 7 from the DEC 806 in the second embodiment indicated by the configuration shown in FIG. 11. The operations of the selection circuit 805a and the selection circuit 805b performed according to a selection signals SEL 0–7 output from a circuit (not shown in the attached drawings) are the same as the operation of the selection circuit 805 performed according to the selection signals SEL 0–7 output from a circuit comprising the 3-bit counter 814, the differentiation circuit 815, the 3-bit counter 816, and the DEC 807 in the second embodiment indicated by the configuration shown in FIG. 11.

Figure 15:
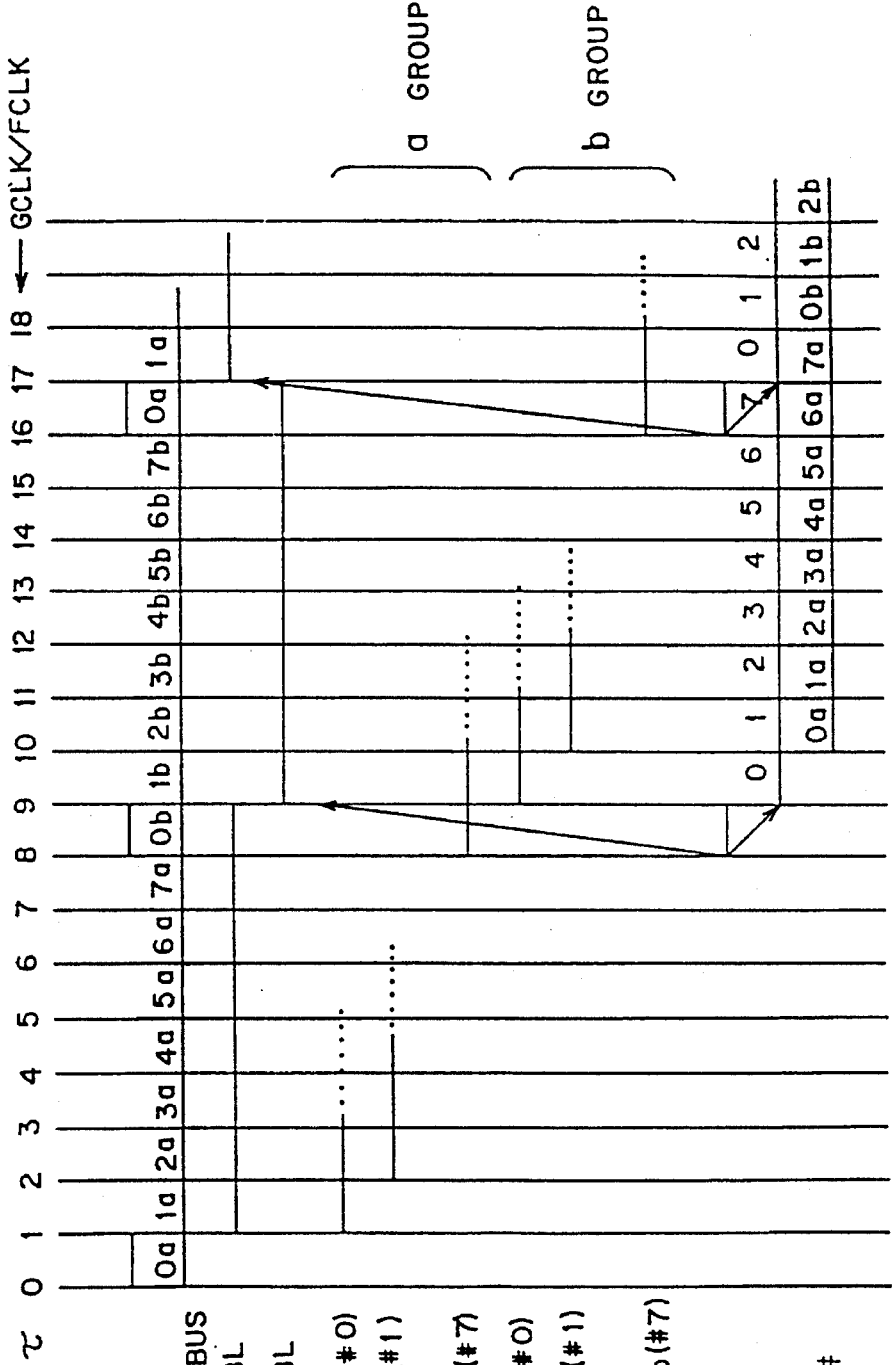
FIGS. 15A–15I are timing charts showing the operation according to the third embodiment.

As shown by FIGS. 15C, 15D and 15E, each time a count completion signal CEND as indicated in the second embodiment is entered from a counter (not shown in the attached drawings) which is similar to a 3-bit counter 814 shown in FIG. 11, the inverting F/F 901 inputs a DECa_ENBL signal, that is, its own negative logic output, to its own positive logic input, thereby alternately switching between 0 and 1 the logic value of a DECb_ENBL signal, that is, its own positive logic output, and the logic value of the DECa_ENBL signal of its own negative logic output.

While the logic value of the DECa_ENBL signal is 1 (the logic value of the DECb_ENBL signal is 0), the DEC 806b does not operate but the DEC 806a operates. Thus, the write instruction STR 64 (at 0τ) shown in FIG. 15A and the 8 sets of write data (0a~7a) shown in FIG. 15B sequentially input from the storage control device (not shown in the attached drawings) to an F/F 810 are, as shown in FIG. 15E, sequentially written to the 8 WD_REGs 804a (a group). On the other hand, while the logic value of the DECb_ENBL signal is 1 (the logic value of the DECa_ENBL signal is 0), the DEC 806a does not operate but the DEC 806b operates. Thus, the write instruction STR 64 (at 8τ) shown in FIG.

15A and the 8 sets of write data (0b~7b) shown in FIG. 15B sequentially input from the storage control device (not shown in the attached drawings) to an F/F 810 are, as shown in FIG. 15F, sequentially written to the 8 WD_REGs 804b (b group).

The count completion signal CEND becomes active when write data are completely stored in the 8 WD_REGs 804a (a group) (at 8τ shown in FIG. 15E)) if the inverting F/F 901 makes active the DECa_ENBL signal, that is, its own negative logic output, and when write data are completely stored in the 8 WD_REGs 804b (b group) (at 16τ shown in FIG. 15E)) if the inverting F/F 901 makes active the DECb_ENBL signal, that is, its own negative logic output.

Accordingly, if the 8 sets of write data specified by a write instruction STR 64 are completely written to the 8 WD_REGs 804a (a group), then the 8 sets of write data specified by the next write instruction STR 64 are written to the 8 WD_REGs 804b (b group). If the writing operation is completed for the b group, then the 8 sets of write data specified by the next write instruction STR 64 are written to the 8 WD_REGs 804a (a group).

If the logic value of the DECb_ENBL signal is 1 (the logic value of the DECa_ENBL signal is 0), then the selection circuit 902 selects an output of the selection circuit 805b (b group) to sequentially transfer to the F/F 811, in the order of 0b, 1b, 2b, . . . as shown in FIG. 15I, the 8 sets of write data sequentially output by the selection circuit 805b according to the selection signal SELi (for example, SELs 0~7 shown in FIG. 15H), and written to and stored in the 8 WD_REGs 804b (b group). By contrast, if the logic value of the DECa_ENBL signal is 0 (the logic value of the DECb_ENBL signal is 1), then the selection circuit 902 selects an output of the selection circuit 805a (a group) to sequentially transfer to the F/F 811 (refer to 0a~7a shown in FIG. 15I, the 8 sets of write data sequentially output by the selection circuit 805a according to the selection signal SELi (for example, SELs 0, 1, 2, . . . shown in FIG. 15H), and written to and stored in the 8 WD_REGs 804a (a group).

Thus, while write data are being written to the WD_REG 804a (a group), write data are output from the WD_REG 804b (b group), which has already finished its writing operation, to RAMs (not shown in the attached drawings). While write data are being written to the WD_REG 804b (b group), write data are output from the WD_REG 804a (a group), which has already finished its writing operation, to RAMs (not shown in the attached drawings). As a result, a storage control device (not shown in the attached drawings) transfers each write instruction STR 64 and specified write data to the main storage device 802 consecutively without delay.

Figure 16:
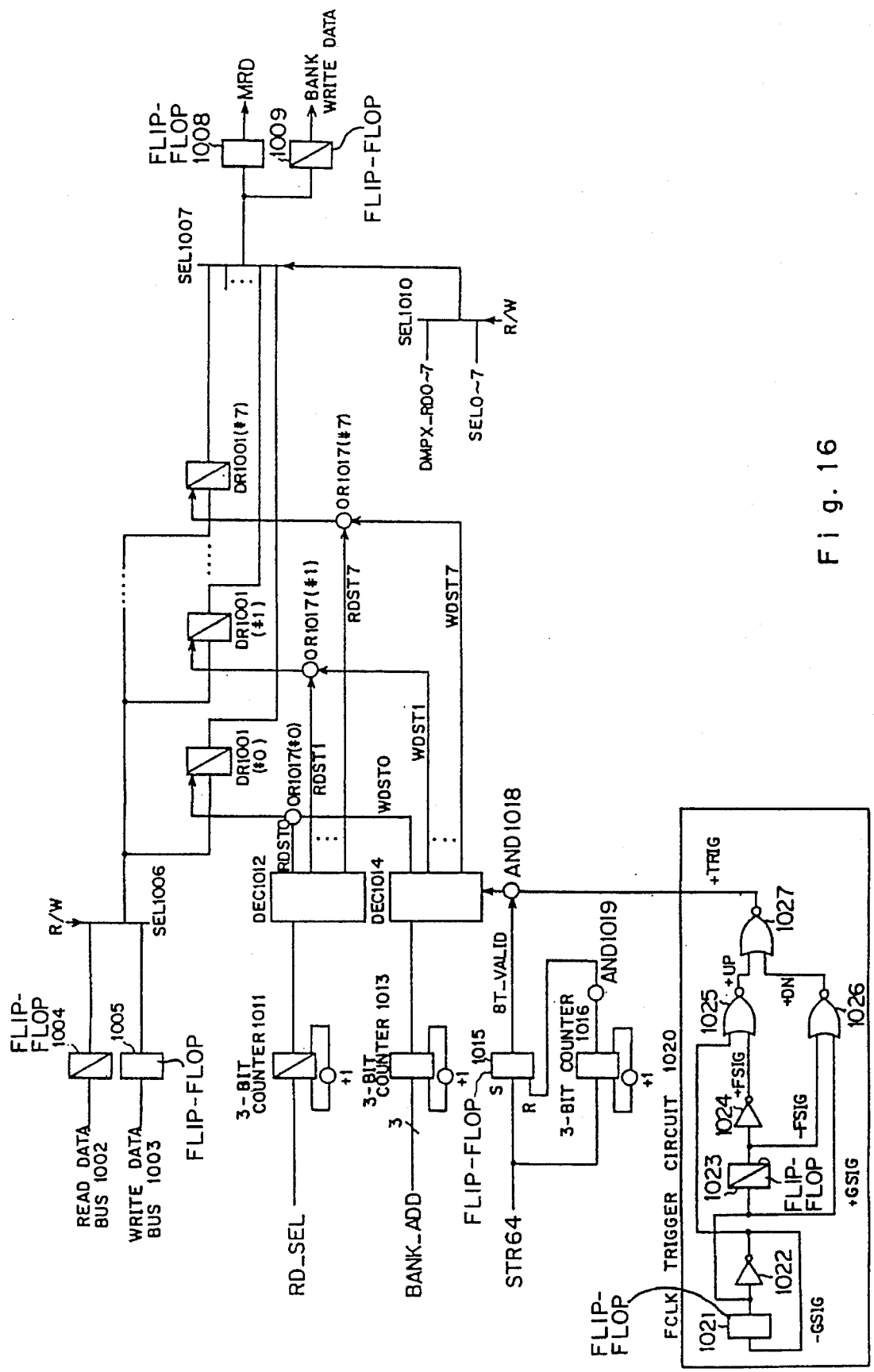
FIG. 16 shows the configuration according to the fourth embodiment of the present invention.

FIG. 16 shows the configuration according to the fourth embodiment of the present invention. As shown in the second embodiment (FIG. 11) and the third embodiment (FIG. 14), the write data are transferred from the storage control device synchronously with the GCLK, sequentially stored in the write data registers (WD_REG) of the number equal to the access unit of the consecutive access mode, and written to the RAMs consecutively in the consecutive access mode synchronously with the FCLK after the contents of the WD_REGs are confirmed. Thus guaranteed is a normal writing operation in the single clock mode of the main storage device operable in the consecutive access mode.

The above described write data register (WD_REG) or read data register (MDR) is the hardware not required normally when the main storage device operates in the normal clock mode, that is, a normal operation mode. Therefore, it is desirable to reduce the scale of the hardware required only in the single clock mode so that the cost of the main storage device can be minimized.

If the data bus between the storage control device and the main storage device is designed as a two-way bus commonly used to transfer write data and read data, then a writing operation and a reading operation are not performed simultaneously. Under such conditions, a set of data registers are selected as either a set of write data registers (WD_REG) or a set of read data registers (MDR), in the following fourth embodiment, thereby realizing the reduction of the scale of hardware.

As described above by referring to the second or third embodiment, write data should be written to the write data register (WD_REG) synchronously with the GCLK so that the write data sent from the storage control device synchronously with the GCLK can be successfully stored. On the other hand, read data to the read data register (MDR) should be written synchronously with the FCLK as described by referring to the third prior art so that the read data output from the RAMs operating synchronously with the FCLK can be successfully stored.

According to the fourth embodiment indicated by the configuration shown in FIG. 16, providing a mechanism for converting a signal synchronous with the GCLK into a signal synchronous with the FCLK allows a set of the data registers DR 1001 #0~#7 operating synchronously with the FCLK to selectively store the write data input synchronously with the GCLK and the read data input synchronously with the FCLK.

Described first is the operation performed when the main storage device with the configuration shown in FIG. 16 receives a read instruction from a storage control device (not shown in the attached drawings).

First, since an R/W signal indicating either a read state or a write state is output from a storage control device (not shown in the attached drawings), it synchronizes with the GCLK. If the R/W signal indicates a read state, then a selection circuit (SEL) 1006 selects a read data bus 1002. As a result, the read data read from the RAMs (not shown in the attached drawings, but corresponding to, for example, the RAMs 301 shown in FIG. 4) operating synchronously with the FCLK to the read data bus 1002, are input to the DRs 1001 #0~#7 through an F/F 1004 operating synchronously with the FCLK.

When an output value of a 3-bit counter 1011 which increments the value of the RD_SEL data, that is, an initial value, by 1 is decoded by a decoder (DEC) 1012, read data set signals RDST 0~7 each having the 1-clock time of the FCLK output from the decoder (DEC) 1012 sequentially become active. These read data set signals RDST 0~7 are input to the DRs 1001 #0~#7 through OR gates (OR) 1017 #0~#7.

As a result, the 8 sets of read data are sequentially input from the read data bus 1002 synchronously with the FCLK, and then sequentially stored in the DRs 1001 #0~#7. When the selecting data are output from a 3-bit counter (not shown in the attached drawings) operating synchronously with the GCLK and then decoded by a decoder (not shown in the attached drawings), selection signals DMPX_RD 0~7, which sequentially become active, are provided from the decoder to a SEL 1010. When the R/W signal indicates a read state, then the SEL 1010 selects the selection signals DMPX_RD 0~7. As a result, each of the outputs of the 8 DRs 1001 is sequentially selected by a SEL 1007 and sequentially output as eight 8-byte memory read data MRD to a storage control device (not shown in the attached drawings) through an F/F 1008 which operates synchronously with the GCLK and has an 8-byte data width.

Described next is the operation performed when the main storage device with the configuration shown in FIG. 16 receives a write instruction from a storage control device (not shown in the attached drawings). When the R/W signal indicates a write state, the SEL 1006 selects a write data bus 1003. As a result, the 8 sets of write data transferred via the write data bus 1003 synchronously with the GCLK from a storage control device (not shown in the attached drawings) are input to the DRs 1001 #0–#7 through an F/F 1005 synchronously with the GCLK.

On the other hand, a value of the 3-bit bank address part BANK ADD in the write address specified by a storage control device (not shown in the attached drawings) is input to a 3-bit counter 1013 which increments the value by 1 synchronously with the GCLK. The 3-bit counter 1013 has the same function as the 3-bit counter 813 of the second embodiment shown in FIG. 11. That is, the 3-bit counter 1013 outputs a value of the 3-bit bank address part BANK ADD only when it first synchronizes with the GCLK. Afterwards, it increments by 1 the value of the bank address part BANK ADD as an initial value each time the GCLK is input. In the 3-bit counter 1013, the count value returns to 0 if it has reached 7, and the counter counts from 0 again. The count value of the 3-bit counter 1013 is decoded by the decoder (DEC) 1014.

A set/reset-type F/F 1015 is set synchronously with the increment made by the 3-bit counter 1013 when the write instruction STR 64 is input by a storage control device (not shown in the attached drawings). A 3-bit counter 1016 inputs a 3-bit output of the counter to an AND gate (AND) 1019 after being activated when the write instruction STR 64 is input. Thus, the AND 1019 is set ON when all 3-bit outputs of the 3-bit counter 1016 become active after the 3-bit counter 1016 counts 8 inputs of the GCLK. Accordingly, when 8 GCLKs are counted, the F/F 1015 is reset by an output of the AND 1019. As a result, the F/F 1015 outputs an 8T_VALID signal which becomes active for the 8-clock time of the GCLK from when the write instruction STR 64 is entered. An AND 1018 inputs a +TRIG signal, which has a 1-clock time of the FCLK and becomes active when the GCLK indicates a change, as a decode enable signal to the DEC 1014 while the 8T_VALID signal is active.

As a result, the DEC 1014 sequentially sets active the write data set signals WDST 0~7, which is set depending on a count value synchronous with the GCLK from the 3-bit counter 1013, for a 1-clock time of the FCLK synchronously with the FCLK. These write data set signals WDST 0~7 are input to the DRs 1001 #0–#7 through the OR gates (OR) 1017 #0–#7.

Thus, the 8 sets of the write data sequentially input from the write data bus 1003 synchronously with the GCLK are sequentially stored in the DRs 1001 #0–#7 operating synchronously with the FCLK.

As described above, the DR 1001 always operates synchronously with the FCLK, but can be commonly used to store write data and read data when it stores data by writing write data in the DR 1001 only when the GCLK indicates a change.

When the R/W signal indicates a write state, the SEL 1010 selects selection signals SEL 0~7. These selection signals SEL 0~7 are output from a circuit (not shown in the attached drawings) corresponding to the circuit according to the second embodiment as shown in FIG. 11 comprising the 3-bit counter 814, differentiation circuit 815, 3-bit counter 816, and DEC 807, and sequentially become active synchronously with the FCLK. As a result, each piece of the 8 sets of write data is sequentially selected by the SEL 1007 and sequentially written as 8 sets of bank write data to RAMs (not shown in the attached drawings) through an F/F 1009 which has a 8-byte data length and operated synchronously with the FCLK.

Figure 17:
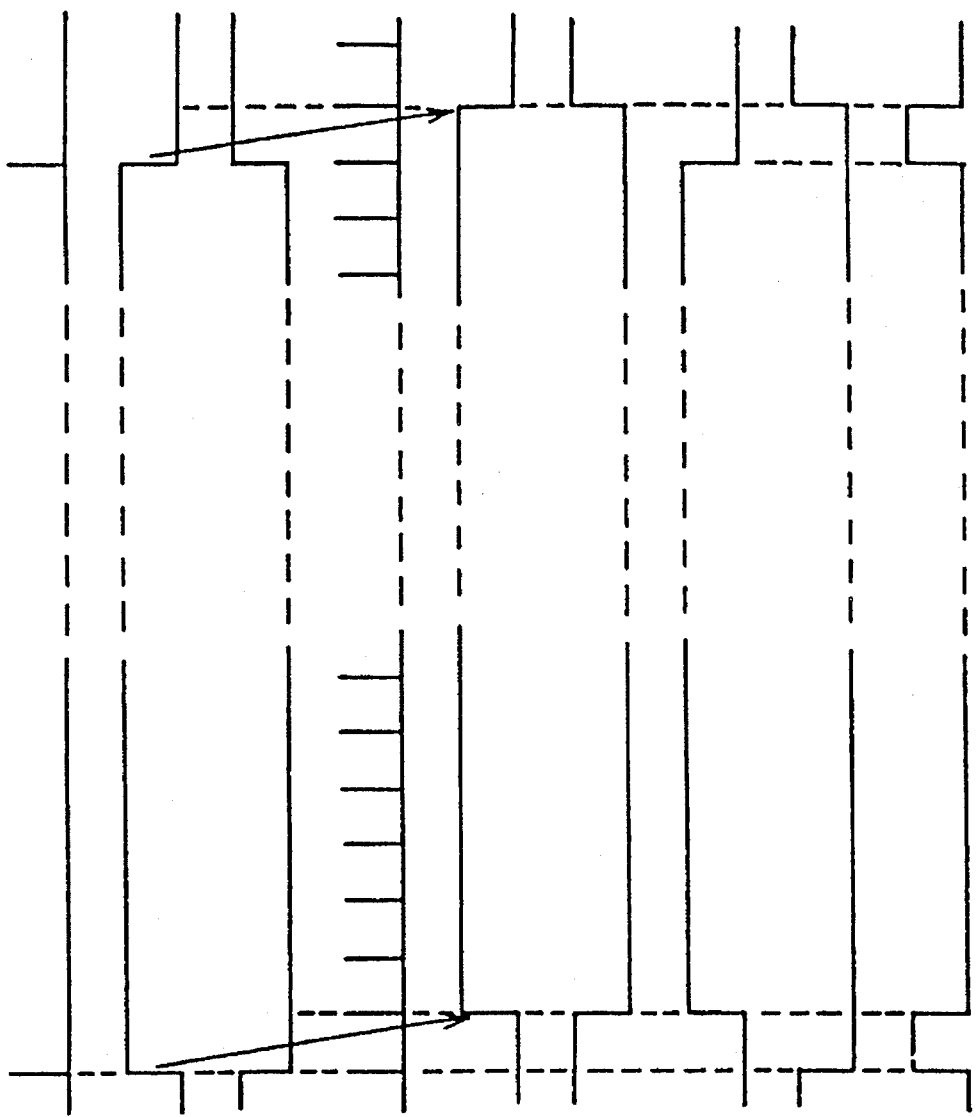
FIGS. 17A–17I are timing charts showing the operation of the FCLK trigger circuit.

FIG. 17 is a timing chart showing the operation of the FCLK trigger circuit 1020 shown in FIG. 16.

A unit comprising an F/F 1021 operating synchronously with the GCLK and an inverter 1022 generates a +GSIG signal shown in FIG. 17B and a –GSIG signal shown in FIG. 17C. These signals are opposite in polarity to each other and changes synchronously with the GCLK shown in FIG. 17A.

An F/F 1023 operating synchronously with the FCLK as shown in FIG. 17 generates a –FSIG signal shown in FIG. 17E by delaying the +GSIG signal shown in FIG. 17 by 1-clock of the FCLK. An inverter 1024 generates a +FSIG signal shown in FIG. 17F by inverting the polarity of the –FSIG signal.

A NOR gate (NOR) 1025 outputs a +UP signal shown in FIG. 17G by receiving the –GSIG signal shown in FIG. 17C and the +FSIG signal shown in FIG. 17. A NOR 1026 outputs a +DN signal shown in FIG. 17H by receiving the +GSIG signal shown in FIG. 17B and the –FSIG signal shown in FIG. 17E.

As shown in FIG. 17I, by receiving the +UP signal shown in FIG. 17E and the +DN signal shown in FIG. 17H, a NOR 1027 generates a +TRIG signal which becomes active for 1-clock time of the FCLK shown in FIG. 17D when the GCLK indicates a change as shown in FIG. 17A.

By controlling the DEC 1014 when the write data are entered according to the +TRIG signal, the DR 1001 operating synchronously with the FCLK stores write data when the GCLK indicates a change.

The FCLK trigger circuit 1020 can be a single circuit in a memory device an output of which can be commonly used by a plurality of circuits to synchronize the GCLK with the FCLK.

The fourth embodiment can be designed to have plural sets of data registers to be commonly used as plural sets of write data registers (WD_REG) and plural sets of read data registers (MDR).

Figure 18:
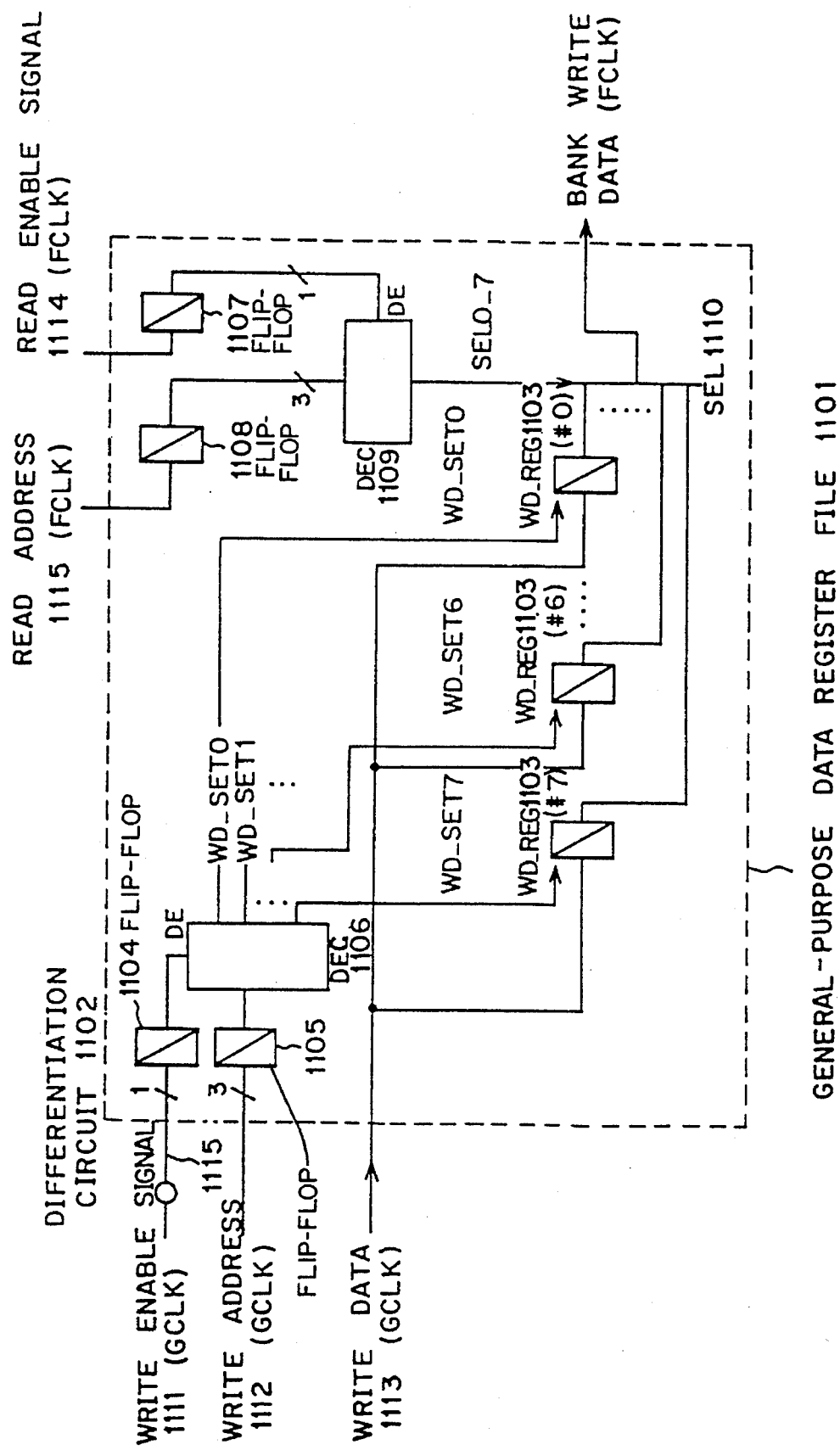
FIG. 18 shows the configuration according to the fifth embodiment of the present invention.

FIG. 18 shows the configuration according to the fifth embodiment of the present invention.

For example, in the 8 WD_REG 804 in the second embodiment as shown in FIG. 11, write data should be stored in the WD_REG 804 synchronously with the GCLK in order to store the write data transferred from the storage control device 801 synchronously with the GCLK. Therefore, the data are stored according to the write data set signals WD_SET 0~7 which are generated through the GCLK-synchronous operations of the 3-bit counter 813 and the DEC 806 and are actually operated synchronously with the GCLK.

On the other hand, write data should be transferred from 8 the WD_REGs 804 to the RAMs 809 synchronously with the FCLK so that the RAMs 809 comprising DRAMs can fetch write data synchronously with the FCLK. Accordingly, the selection circuit 805 sequentially selects outputs of the 8 WD_REGs 804 according to the selection signals SEL 0~7 synchronous with the FCLK which are generated through the FCLK-synchronous operations of the 3-bit counter 816 and the DEC 807.

A unit comprising the 8 WD_REGs 804, DECs 806 and 807, and selection circuit 805 can be provided as an integrated circuit, that is, a data register file 808, as shown in FIG. 11. A register file has a merit of comprising a smaller number of gates but having the same capacity as a general write data register comprising a large number of F/Fs.

However, a general-purpose register file has normally a single clock signal input terminal. Therefore, it is difficult that the data register file 808 containing a plurality of circuits synchronous with different clocks as shown in FIG. 11 can comprise general-purpose register files, etc.

According to the fifth embodiment shown in FIG. 18, providing the differentiation circuit 1102 for converting a control signal synchronous with the GCLK for use in storing write data in a write data register into a signal synchronous with the FCLK enables a general-purpose data register file 1101 comprising only a circuit synchronous with the FCLK to be used as the data register file 808 shown in FIG. 11.

In FIG. 18, the general-purpose data register file 1101 should replace the data register file 808 shown in FIG. 11. Write data registers WD_REG 1103 correspond to the WD___REGs 804 #0~#7 shown in FIG. 11. DECs 1106 and 1109 correspond to the DECs 806 and 807 shown in FIG. 11.

Write data 1113 are transferred from the storage control device 801 shown in FIG. 11, are stored in the F/F 810, and synchronizes with the GCLK.

Write address 1112 is generated by the 3-bit counter 813 operating synchronously with the GCLK as described by referring to FIG. 11, and is actually operated synchronously with the GCLK. The write address 1112 is input to the DEC 1106 through an F/F 1105 operated in the general-purpose data register file 1101 synchronously with the FCLK.

A write enable signal 1111 is not shown in FIG. 11, is provided by the storage control device 801, synchronizes with the GCLK, and is input to the differentiation circuit 1102. The differentiation circuit 1102 generates a write enable signal pulses 1115 synchronous with the FCLK and active for a 1-clock time of the FCLK when the GCLK indicates a change while the write enable signal 1111 is active. The differentiation circuit 1102 can be realized as, for example, the following circuit. That is, the differentiation circuit 1102 generates pulses similar to the +TRIG signals shown in FIG. 17I using the circuit similar to the FCLK trigger circuit 1020 shown in FIG. 16. The pulses are input to the AND gates which is set ON while the write enable signal 1111 is active, thereby generating write enable signal pulses 1115.

Thus generated write enable signal pulses 1115 are input to the DEC 1106 as decode enable signals DE through an F/F 1104 operating synchronously with the FCLK. As a result, the DEC 1106 sequentially sets active the write data set signals WD_SET 0~7 for the write address 1112 which is output from the 3-bit counter 813 shown in FIG. 11 and is operated synchronously with the GCLK. The write data set signals WD_SET 0~7 are sequentially set active for 1-clock time of the FCLK synchronously with the FCLK when the GCLK indicates a change. Therefore, write data are written to the WD_REG 1103 operating synchronously with the FCLK only when the GCLK indicates a change.

On the other hand, if the write data in the WD_REG 1103 are transferred to the RAMs 809 shown in FIG. 11, an output of the 3-bit counter 816 shown in FIG. 11 is input to the DEC 1109 through an F/F 1108 operating synchronously with the FCLK. Although not shown in FIG. 11, a read enable signal 1114 synchronous with the FCLK is input as a decode enable signal DE to the DEC 1109 through an F/F 1107 operating synchronously with the FCLK. As a result, the DEC 1109 sequentially outputs to the selection circuit 805 synchronously with the FCLK the selection signals SEL 0~7 for the count value output by the 3-bit counter 816 as in the DEC 807 shown in FIG. 11. Thus, each piece of the write data stored in the 8 WD_REGs 1103 is sequentially selected by the selection circuit 805, and is sequentially transferred as a piece of 8 sets of bank write data to the RAMs 809 shown in FIG. 11 through the F/F 811 shown in FIG. 11 as having 8-byte data width and operating synchronously with the FCLK.

As described above, only by providing the differentiation circuit 1102, the data register file 808 shown in FIG. 11 can be realized by the general-purpose data register file 1101 operated using only the FCLK according to the fifth embodiment.

Figure 19:
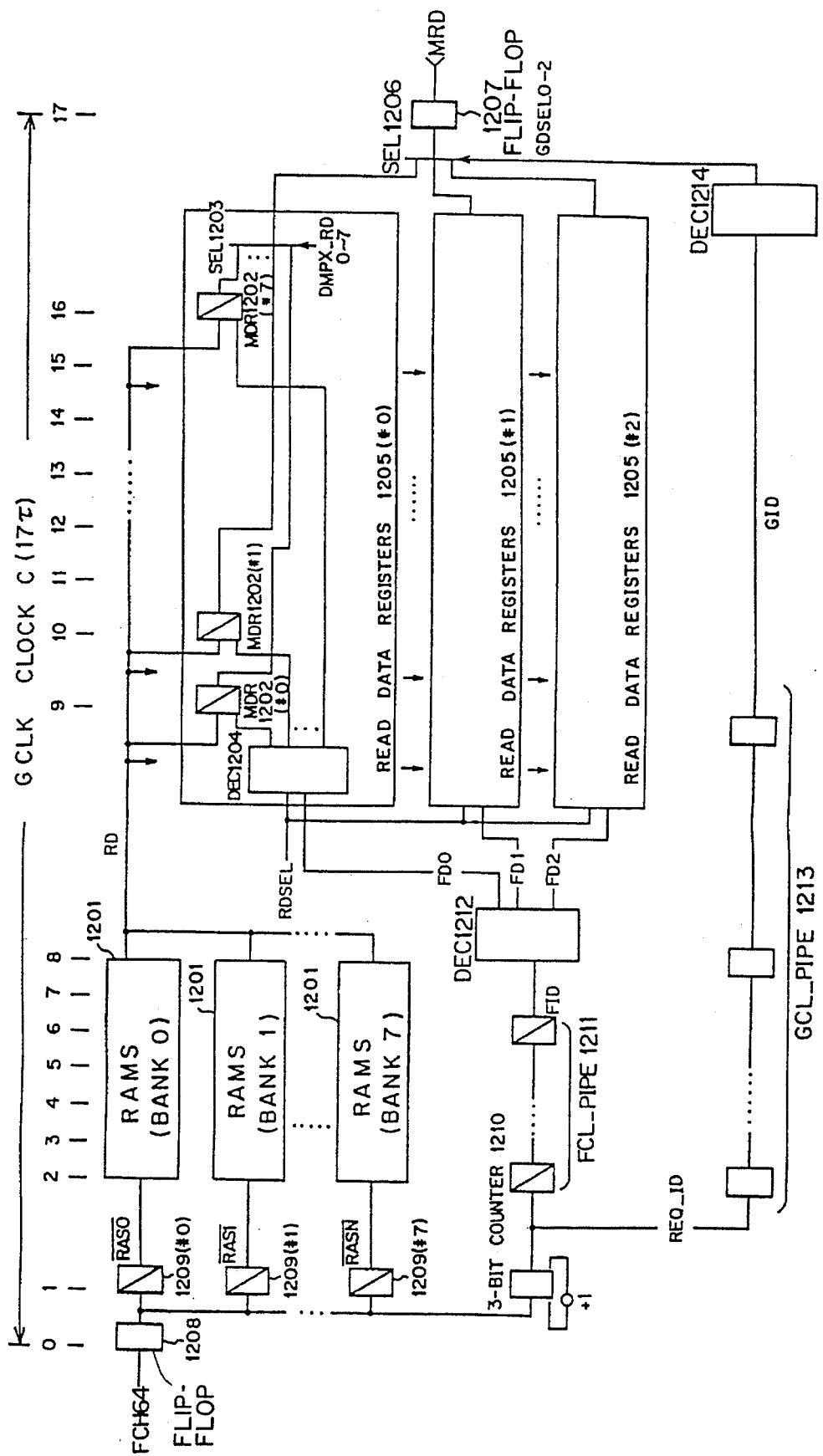
FIG. 19 shows the configuration according to the sixth embodiment of the present invention.

FIG. 19 shows the configuration of the main storage device according to the sixth embodiment of the present invention. This embodiment is to solve the problems pertaining to the third prior art in the second technological field.

The sixth embodiment defines 3 sets of read data registers 1205 #0~#2. Each set comprises the decoder DEC 1204, the MDR 1202 #0~#7, and the selection circuit SEL 1203.

An access ID is used to specify the read data registers 1205 #0~#2. The access ID is generated by the 3-bit counter 1210. The 3-bit counter 1210 increments its count value by 1 each time the read instruction FCH 64 is input from a storage control device (not shown in the attached drawings) to an F/F 1208. The 3-bit counter 1210 can be designed to increment the count value when a single read instruction FCH 64 is executed in the main storage device. The count value of the 3-bit counter 1210 changes cyclically, for example, 0, 1, 2, 0, 1, . . . If the read instruction FCH 64 is entered at intervals of 8τ at shortest as shown in FIG. 20A, then an output REQ_ID of the 3-bit counter 1210 is fixed for the interval of 8τ as shown in FIG. 20B.

The REQ_ID signal is input to the pipeline FCL_PIPE 1211 operating synchronously with the FCLK when the RAMs 1201 are activated. After the REQ_ID signal is delayed in the pipeline FCL_PIPE 1211, it is input as a FID signal to the decoder DEC 1212 when the read data RD starts being read from the RAMs 1201 activated through an F/F 1209. In response to the value of the FID signal, the DEC 1212 outputs a decode enable signal FDi (i can be one of 0, 1, and 2) only to a single DEC 1204 in the read data registers 1205 #0~#2. While the REQ_ID signal is fixed for the time of 8τ as shown in FIG. 20B, the FID signal is also fixed for the time of 8τ as shown in FIG. 20C. Thus, the decode enable sinal FDi is fixed for the time of 8τ synchronously with the FID signal shown in FIG. 20C.

As a result, 8 sets of read data RD consecutively read from the activated RAMs 1201 at a timing shown in FIG. 20 are sequentially stored in the MDRs 1202 #0~#7 at a timing shown in FIG. 20E according to 8 read data set signals sequentially output from the DEC 1204 in response to 8 values of read data selection signals RDSEL sequentially output from a 3-bit counter (not shown in the attached drawings) operating synchronously with the FCLK.

The REQ_ID signal output from the 3-bit counter 1210 is input to the GCL_PIPE 1213 operating synchronously with the GCLK. The REQ_ID signal is delayed in the GCL_PIPE 1213, and then input to the DEC 1214 when the read data specified by the read instruction FCH 64, which generated the REQ_ID signal, are output from any of the read data registers 1205. Depending on the value of the GID signal, the DEC 1214 sets active the selection signal GDSELi (i can be 0~2) for selection of an output of one of the read data registers 1205 #0~#2. While the REQ_ID signal is fixed for the time of 8τ as shown in FIG. 20B, the GID signal is fixed for the time of 8τ as shown in FIG. 20F. Therefore, the selection signal GDSELi is also fixed for the time of 8τ synchronously with the GID signal shown in FIG. 20F.

Figure 4:
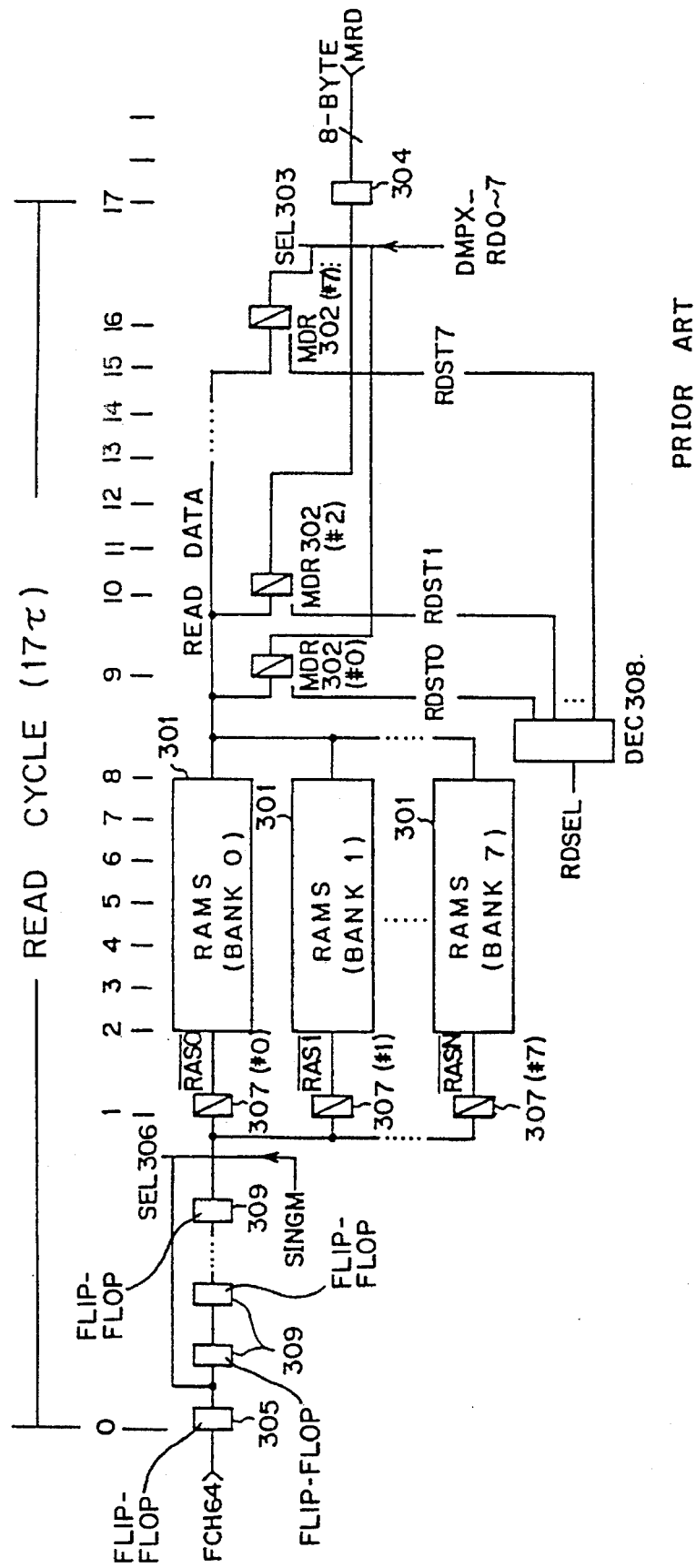
FIG. 4 shows the configuration of the third prior art.
Figure 5:
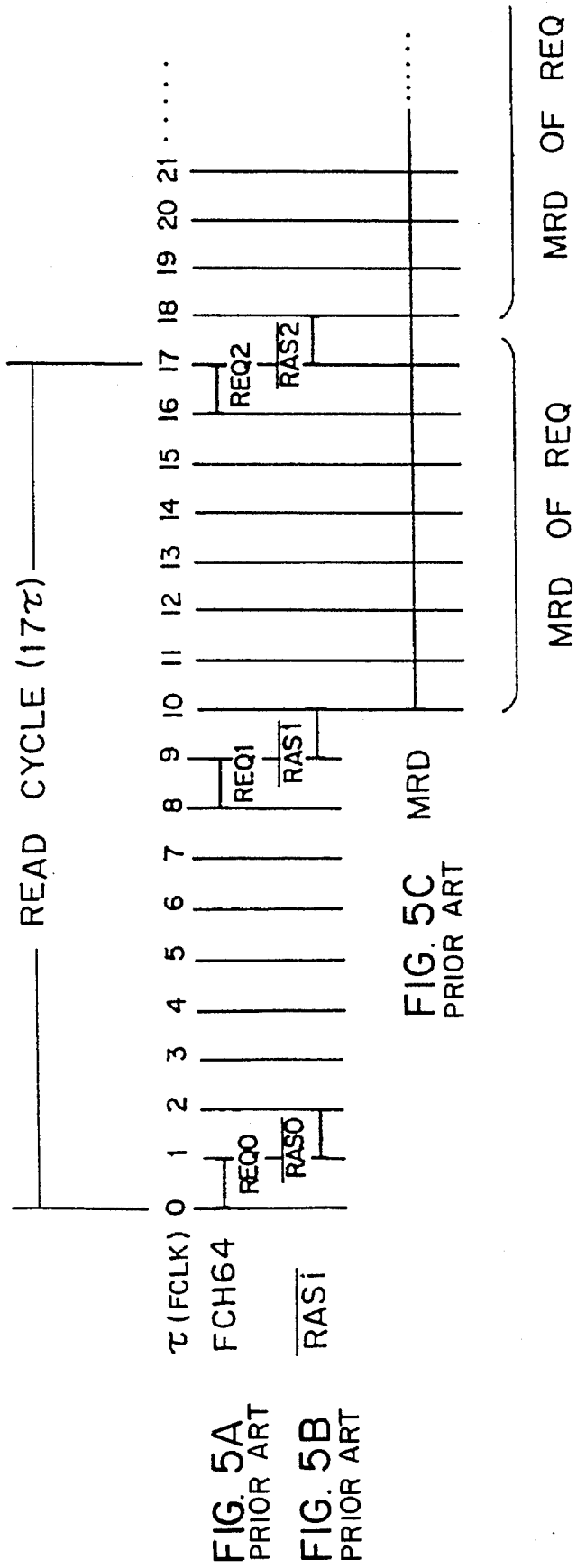
FIG. 5A–5C are timing charts showing the operation of the third prior art in a normal clock mode.
Figure 6:
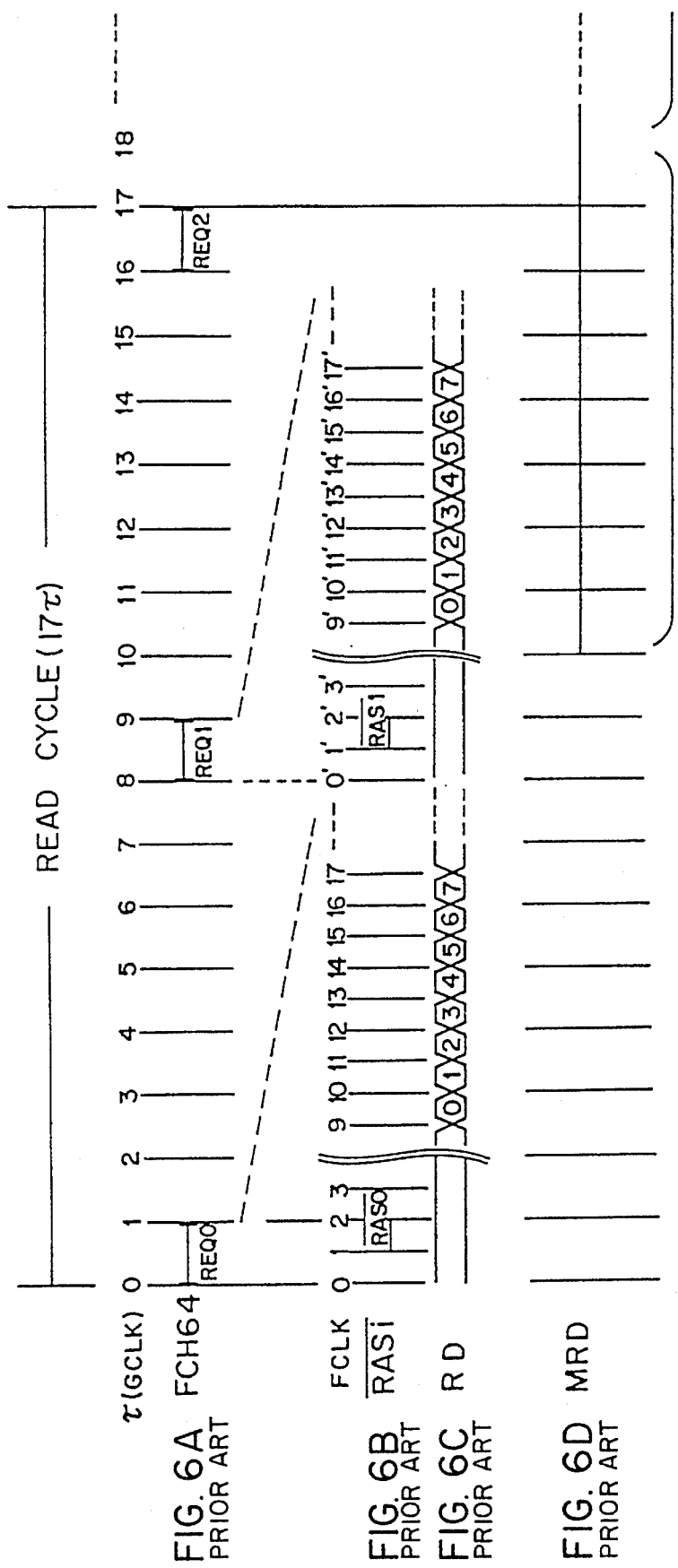
FIG. 6A–6D are timing charts showing the operation of the third prior art in a single clock mode.

As in the case of the third prior art shown in FIG. 4, selection signals DMPX_RD 0~7, which are sequentially set active, are provided from a decoder (not shown in the attached drawings) to the SEL 1203 as shown in FIG. 20G after the selection data output by a 3-bit counter (not shown in the attached drawings) operating synchronously with the GCLK are decoded by the decoder in the read data registers 1205 which is to start reading data. As a result, each of the outputs of 8 MDRs 1202 is selected by the SEL 1203 and output to the SEL 1206.

The SEL 1206 sequentially outputs according to a selection signal GDSELi to a storage control device (not shown in the attached drawings) through an F/F 1207 and a read data bus (not shown in the attached drawings) both of which operate synchronously with the GCLK and have 8-byte data width each of the outputs of the 8 MDRs 1202 output from the read data registers 1205 as eight pieces of 8-byte memory read data MRD shown in FIG. 20H.

With the configuration according to the sixth embodiment shown in FIG. 19, the read cycle from the issue of the read instruction FCH 64 from a storage control device (not shown in the attached drawings) to the complete transfer of all 8 sets of read data RD consecutively output from the RAMs 1201 in the main storage device to the F/F 1207, which is located first or the output side of the main storage device and operates synchronously with the GCLK, is a 17-clock time of the GCLK (17τ) as in the case of the third prior art. A read instruction FCH 64 possibly output at intervals of 8τ at shortest from a storage control device (not shown in the attached drawings) can be input 3 times at maximum within the above mentioned cycle. As in the third prior art, a single read instruction FCH 64 outputs read data of 8 bytes×8 pieces=64 bytes to a read data bus having a 8-byte data width, and the single read instruction FCH 64 occupies the time 8τ of the read data bus. Thus, the storage control device outputs the read instruction FCH 64 at intervals of 8τ.

According to the sixth embodiment, the read instruction FCH 64 input at intervals of 8τ at shortest from a storage control device (not shown in the attached drawings) activates the RAMs 1201 without delay in the main storage device. Thus, the consecutively read 8 sets of read data are stored sequentially and cyclically in the read data registers 1205 #0–#2 sequentially selected according to a FID signal (decode enable signal FDi).

Even if at maximum two new read instructions FCH 64 are entered to activate the RAMs 1201 and read new read data until read data RD have been read from one of the read data registers 1205 when the main storage device shown in FIG. 19 operates in the single clock mode, the data can be sequentially stored in the other two read data registers 1205, thereby preventing the read data from being lost.

In this case, the read instructions FCH 64 activate the RAMs 1201 without delay in the main storage device regardless of the operation mode of the main storage device, that is, the normal clock mode or the single clock mode. Namely, since the operations of the main storage device are the same in the normal clock mode and the single clock mode according to the sixth embodiment, a fault occurring in the main storage device in the normal clock mode can be easily analyzed in the single clock mode.

As described above, according to the first aspect of the present invention, the first-unit data block is divided into the second-unit data blocks and the data blocks are allocated to memories, thereby reducing the probability of consecutively accessing the same memories even if a plurality of transfer instructions are simultaneously issued to transfer a plurality of blocks each comprising the second-unit data specified by the requests from a plurality of the CPUs. As a result, an average activation time of the memories can be shortened, and a high-throughput memory device can be realized.

According to the second aspect of the present invention, a fault of writing invalid data to the memories can be successfully avoided even in the single clock mode of the memories.

According to the second aspect, the activation of the memories is considerably delayed in the single clock mode. The delay is recognized only in the memories and does not affect the entire throughput of the computer system.

According to the second aspect, the same operations are guaranteed in the single clock mode and the normal clock mode.

Also according to the second aspect, two sets of write data buffer units enable each write instruction and write data specified by the instruction to be consecutively transferred without delay.

Furthermore, according to the second aspect, storing write data in a data buffer unit according to a timing signal which becomes active synchronously with the first clock when the second clock indicates a change enables the data buffer unit operating synchronously with the first clock when the read data are stored to be also used to store the write data, thereby minimizing the scale of the hardware of the memory devices.

If a simple timing signal generating unit is provided externally in the second aspect, a write data buffer unit can be designed to comprise a general-purpose data register file operating according to a clock of a single type.

According to the third aspect of the present invention, even if new plural read instructions are entered to activate memories and read new read data until read data have been read from one set of the read data buffer units when the memory device operates in the single clock mode, the data can be sequentially stored in other plural read data buffer units, thereby preventing the read data from being lost.

In this case, the read instructions activate the memories without delay in the memory device regardless of the operation mode of the memory device, that is, the normal clock mode or the single clock mode. Namely, since the operations of the memory device are the same in the normal clock mode and the single clock mode according to the third aspect, a fault occurring in the memory device in the normal clock mode can be easily analyzed in the single clock mode.

What is claimed is:

1. A memory control device which receives a request to transfer a series of first-unit data in an address space, divides the first-unit data into second-unit data, assigns priority levels to the second-unit data, issues a data transfer instruction plural times to transfer the second-unit data to a memory device comprising a plurality of memories operable in a consecutive access mode, and thus accesses the memories in response to the request to transfer the first-unit data, comprising:

means for sequentially allocating in third units the second-unit data specified by the data transfer instruction to the memories of at most a number obtained by dividing the first unit by the third unit, said third unit being equal to the second unit or being obtained by dividing the second unit and being a multiple of an activation unit of the memories; and means for accessing data in the allocated memories in the third units in consecutive access mode.

2. A memory control device for controlling a data write to a memory device comprising a plurality of memories which are accessed synchronously with a first clock which is ceaselessly generated in an operation state, and wherein the memory device can be operated in a consecutive access mode, comprising:

write data buffer means for storing at least write data stored in access units of the consecutive access mode;

write data storage control means for sequentially storing in said write data buffer means synchronously with a second clock, which is made inactive, write data transferred synchronously with the second clock according to a write instruction; and write data read control means for reading stored write data stored in the access units synchronously with the first clock in the consecutive access mode when the write data stored in the access units are stored in said write data buffer means, and for transferring the read data to any of the plurality of memories.

3. The memory control device according to claim 2, further comprising:

another set of said write data buffer means; and switching means for having said write data storage control means store write data stored in the access units in one of said write data buffer means, for having said write data read control means read the write data stored in the access units from the other set of said write data buffer means to the memories, and for having said write data storage control means and said write data read control means switch said write data buffer means when said write data storage control means and said write data read control means have finished respective processes on the write data stored an the access units.

4. The memory control device according to claim 2, further comprising:

a data bus connected to said memory device which is a two-way bus commonly used to transfer read data and the write data; and timing signal generating means for generating a timing signal which becomes active synchronously with the first clock when the second clock indicates a change in state, wherein said write data buffer means comprises data buffer means for storing data synchronously with the first clock;

said write data storage control means sequentially stores according to the write instruction the write data, transferred via the data bus synchronously with the second clock, in said data buffer means synchronously with the timing signal generated by said timing signal generating means; and said write data buffer means is used as read data buffer means when read data read from said memories synchronously with the first clock are written to the data bus synchronously with the second clock.

5. The memory control device according to claim 2, further comprising:

timing signal generating means for generating a timing signal which becomes active synchronously with the first clock when the second clock indicates a change in state, wherein said write data storage control means sequentially stores according to the write instruction the write data, transferred via the data bus synchronously with the second clock, in said write data buffer means synchronously with the timing signal generated by said timing signal generating means.

6. A memory control device which receives a request to transfer a series of first-unit data in an address space, divides the first-unit data into second-unit data, assigns priority levels to the second-unit data, issues a data transfer instruction plural times to transfer the second-unit data to a memory device comprising a plurality of memories, which are accessed synchronously with a first clock, ceaselessly operated in an operation state, and operated in a consecutive access mode, and thus accesses memories in response to the request to transfer the first-unit data, comprising:

write data buffer means for storing in third units at least data of an access unit of the consecutive access mode and of the second unit specified by the data transfer instruction, said third unit being equal to a second unit or being obtained by dividing the second unit and being a multiple of an activation unit of the memories;

write data storage control means for sequentially storing, in said write data buffer means synchronously with a second clock, which is made inactive, the write data transferred synchronously with the second clock according to a write instruction which is the data transfer instruction;

allocating means for allocating the write data of the third unit stored in said write data buffer means to any of the memories of at most a number obtained by dividing the first unit by the third unit; and write data read control means for reading the stored third-unit write data synchronously with the first clock in the consecutive access mode when the third-unit write data are stored in said write data buffer means, and for transferring the data to the memories allocated to by said allocating means.

7. The memory control device according to claim 6, further comprising:

another set of said write data buffer means; and switching means for having said write data storage control means store the third-unit write data in one of said write data buffer means, for having said write data read control means read the third-unit write data from the other set of said write data buffer means to the memories, and for having said write data storage control means and said write data read control means switch said write data buffer means when said write data storage control means and said write data read control means have finished respective processes on the write data of the access units.

8. The memory control device according to claim 6, further comprising:

a data bus connected to said memory device, which is a two-way bus commonly used to transfer read data and the write data; and timing signal generating means for generating a timing signal, which becomes active synchronously with the first clock when the second clock indicates a change, wherein said write data buffer means comprises data buffer means for storing data synchronously with the first clock;

said write data storage control means sequentially stores according to the write instruction the write data transferred via the data bus synchronously with the second clock in said data buffer means synchronously with the timing signal generated by said timing signal generating means; and said write data buffer means is commonly used as read data buffer means when read data read from said memories synchronously with the first clock are read to the data bus synchronously with the second clock.

9. The memory control device according to claim 6, further comprising:

timing signal generating means for generating a timing signal, which becomes active synchronously with the first clock when the second clock indicates a change, wherein said write data storage control means sequentially stores according to the write instruction the write data, transferred via the data bus synchronously with the second clock, in said data buffer means synchronously with the timing signal generated by said timing signal generating means.

10. A memory control device for storing plural pieces of read data from any of a plurality of memories which are activated according to a read instruction synchronous with a second clock, and for forming a memory device operating in a consecutive access mode synchronously with a first clock which is ceaselessly generated in an operation state, and for outputting the plural pieces of stored read data to a data bus synchronously with the second clock, comprising:

read data buffer means of at least a number of read instructions possibly entered in the memory device before all of the plural pieces of data consecutively output from the memories have been output from said read data buffer means to the data bus after the read instruction is first issued, each set of said read data buffer means having size enough to store the plural pieces of read data consecutively output from the memories activated by a single read instruction in the consecutive access mode;

read data storage control means for sequentially storing in each set of said read data buffer means synchronously with the first clock each set of read data read from any of the plural memories according to each read instruction; and read data read control means for sequentially outputting to the data bus synchronously with the second clock each set of the read data sequentially stored in each set of said read data buffer means according to each read instruction.

11. The memory control device according to claim 10, further comprising:

first buffer set selecting means for sequentially and cyclically selecting, each time the read instruction is activated or has been executed in the memory device, said plural sets of read data buffer means synchronously with a read from the memories of read data specified by a first activated read instruction or read data specified by a next read instruction activated after the first activated read instruction has been executed; and second buffer set selecting means for sequentially and cyclically selecting, each time all read data stored in a set of said read data buffer means have been output to the data bus, the plural sets of read data buffer means in an order of selection determined by said first buffer set selecting means, wherein said read data storage control means has the read data buffer means selected by said first buffer set selecting means store the read data; and said read data read control means has the read data buffer means selected by said second buffer set selecting means output the read data to the data bus.

12. The memory control device according to claim 11, further comprising:

counter means for sequentially and cyclically specifying the plural sets of data buffer means each time the read instruction is activated or executed in the memory device, wherein said first buffer set selecting means comprises:

first shift register means for operating synchronously with a first clock to delay an output of said counter means by a time from when the read instruction is activated or executed in the memory device to when a read of the read data specified by a first read instruction or of a read data specified by a next read instruction activated after the first read instruction, which has been executed is started from the memories; and first switch means for sequentially and cyclically inputting each set of read data read from the memories to each set of said plural read data buffer means based on an output of said counter means output from said first shift register means; and said second buffer set selecting means comprises:

second shift register means for operating synchronously with a second clock to delay an output of said counter means by a time from when the read instruction is activated or executed in the memory device to when a read of the read data specified by a first read instruction or of the read data specified by a next read instruction activated after the first read instruction, which has been executed is started from any of said read data buffer means; and second switch means for sequentially and cyclically selecting each of the plural sets of read data buffer means and outputting to the data bus the read data stored in the selected read data buffer means based on the output of said counter means output from said second shift register means.

13. A memory control method of receiving a request to transfer a series of first-unit data in an address space, dividing the first-unit data into second-unit data, assigning priority levels to the second-unit data, issuing a data transfer instruction plural times to transfer the second-unit data to a memory device comprising a plurality of memories operable in a consecutive access mode, and thus accessing memories in response to the request to transfer the first-unit data, comprising the steps of:

sequentially allocating in third units the second-unit data specified by the data transfer instruction to the memories of at most a number obtained by dividing the first unit by a third unit, said third unit being equal to the second unit or being obtained by dividing the second unit and being a multiple of an activation unit of the memories; and accessing data in the allocated memories in the third units in a consecutive access mode.

14. A memory control method for controlling a data write to a memory device comprising a plurality of memories which are accessed synchronously with a first clock which is ceaselessly generated in an operation state, and can be operated in a consecutive access mode, comprising the steps of:

sequentially storing, synchronously with a second clock in access units of the consecutive access mode, write data transferred synchronously with a second clock according to a write instruction; and reading the stored write data in the access units synchronously with the first clock in the consecutive access mode when the write data are stored in the access units, and transferring the write data to any of the memories.

15. A memory control method for receiving a request to transfer a series of first-unit data in an address space, dividing the first-unit data into second-unit data, assigning priority levels to the second-unit data, issuing a data transfer instruction plural times to transfer the second-unit data to a memory device comprising a plurality of memories, which are accessed synchronously with a first clock, ceaselessly generated in an operation state, and operated in a consecutive access mode, and thus accessing memories in response to the request to transfer the first-unit data, comprising the steps of:

- sequentially storing synchronously with a second clock according to write instruction, which is the data transfer instruction, in third units data of an access unit of the consecutive access mode and of the second unit specified by the data transfer instruction, said third unit being equal to a second unit or being obtained by dividing the second unit and being a multiple of an activation unit of the memories;
- allocating stored third-unit write data to any of the memories of at most a number obtained by dividing the first unit by the third unit; and
- reading stored third-unit write data synchronously with the first clock in the consecutive access mode when the third-unit write data are stored, and for transferring the data to the allocated memories.

16. A memory control method of storing plural pieces of read data from any of a plurality of memories which are activated according to a read instruction synchronous with a second clock, and for forming a memory device operating in a consecutive access mode synchronously with a first clock which is ceaselessly generated in an operation state, and for outputting the plural pieces of stored read data to a data bus synchronously with the second clock, comprising the steps of:

- determining a number of areas e,al to or larger than a number of read instructions possibly entered in the memories after the read instruction is issued and before all plural pieces of the read data consecutively output from the memories are stored and the stored read data are output to the data bus synchronously with the second clock;
- sequentially storing each set of the read data read from any of the memories according to each read instruction synchronously with the first clock in one of areas of the determined number; and
- sequentially outputting to the data bus each set of the read data sequentially stored in other areas according to respective read instructions.

* * * * *

UNITED STATES PATENT AND TRADEMARK OFFICE
CERTIFICATE OF CORRECTION

PATENT NO. : 5,619,679
DATED : April 8, 1997
INVENTOR(S) : Takashi IBI

It is certified that error appears in the above-indentified patent and that said Letters Patent is hereby corrected as shown below:

Column 6

Line 38, "WD REG" should be --WD_REG--;

Column 7

Line 3, "T'0" should be --T'--.

Column 19

Line 6, "WD REG" should be --WD_REG--.

Column 22

Line 46, "FIG. 15E" should be --FIG. 15G--.

Column 23

Line 8, "FIG. 15E" should be --FIG. 15G--;

Line 13, "FIG. 15E" should be --FIG 15G--.

Column 26

Line 25, "FIG. 17E" should be --FIG. 17G--.

Signed and Sealed this

Fifth Day of August, 1997

Attest:

BRUCE LEHMAN

Attesting Officer

Commissioner of Patents and Trademarks